US011316572B2

(12) United States Patent
Lee et al.

(10) Patent No.: US 11,316,572 B2
(45) Date of Patent: *Apr. 26, 2022

(54) INTERFERENCE MEASUREMENT IN WIRELESS NETWORKS

(71) Applicant: InterDigital Patent Holdings, Inc., Wilmington, DE (US)

(72) Inventors: Moon-il Lee, Melville, NY (US); Paul Marinier, Brossard (CA); Shahrokh Nayeb Nazar, San Diego, CA (US); Allan Y. Tsai, Boonton, NJ (US); Guodong Zhang, Woodbury, NY (US); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,632

(22) Filed: Dec. 24, 2019

(65) Prior Publication Data

US 2020/0186222 A1    Jun. 11, 2020

Related U.S. Application Data

(63) Continuation of application No. 15/943,426, filed on Apr. 2, 2018, now Pat. No. 10,554,281, which is a (Continued)

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0413* (2013.01); *H04B 17/345* (2015.01); (Continued)

(58) Field of Classification Search
CPC .................................................. H04B 7/0626
See application file for complete search history.

(56) References Cited

U.S. PATENT DOCUMENTS 8,478,190 B2 * 7/2013 Sayana ................ H04L 5/0057
455/7
8,599,711 B2  12/2013 Hugl et al.
(Continued)

FOREIGN PATENT DOCUMENTS

CN          101808409 A       8/2010
CN          101841828 A       9/2010
(Continued)

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213 V10.1.0, Mar. 2011, 115 pages.

(Continued)

*Primary Examiner* — Guang W Li
(74) *Attorney, Agent, or Firm* — Yin Shao

(57) ABSTRACT

Embodiments contemplate methods, systems, and apparatuses for interference measurement in a wireless communication network, including wireless communication networks the employ MIMO in uplink and/or downlink communication. Embodiments contemplate identifying one or more interference measurement resource elements that may be received from one or more transmission points. Embodiments also contemplate performing interference measurement estimation based at least in part on the identified one or more interference measurement resource elements. Channel state information (CSI) perhaps in the form of reports may be generated based at least in part on the one or more interference measurement estimation. Embodiments also contemplate that the CSI report may be transmitted to one or (Continued)

more nodes. In some embodiments, the one or more interference measurement resource elements may be received as part of a set of resource elements.

20 Claims, 27 Drawing Sheets

Related U.S. Application Data continuation of application No. 15/275,852, filed on Sep. 26, 2016, now abandoned, which is a continuation of application No. 13/572,142, filed on Aug. 10, 2012, now Pat. No. 9,456,372.

(60) Provisional application No. 61/667,379, filed on Jul. 2, 2012, provisional application No. 61/644,936, filed on May 9, 2012, provisional application No. 61/591,168, filed on Jan. 26, 2012, provisional application No. 61/523,278, filed on Aug. 12, 2011.

(51) Int. Cl.
| | |
|---|---|
| H04B 17/345 | (2015.01) |
| H04L 25/02 | (2006.01) |
| H04B 7/0413 | (2017.01) |
| H04L 5/00 | (2006.01) |
| H04W 24/10 | (2009.01) |
| H04W 72/04 | (2009.01) |
| H04W 72/08 | (2009.01) |
| H04B 7/024 | (2017.01) |
| H04W 84/04 | (2009.01) |

(52) U.S. Cl.
CPC ........ *H04L 5/0037* (2013.01); *H04L 25/0226* (2013.01); *H04W 24/10* (2013.01); *H04W 72/042* (2013.01); *H04W 72/082* (2013.01); *H04B 7/024* (2013.01); *H04W 84/042* (2013.01)

(56) References Cited

U.S. PATENT DOCUMENTS

| | | | | |
|---|---|---|---|---|
| 8,619,693 B2* | 12/2013 | Noh | ............ | H04B 7/0626 370/329 |
| 8,693,463 B2 | 4/2014 | Kazmi et al. | | |
| 8,798,188 B2* | 8/2014 | Kwon | ............ | H04L 5/0053 375/285 |
| 8,838,159 B2 | 9/2014 | Kang et al. | | |
| 8,976,751 B2 | 3/2015 | Yang et al. | | |
| 8,989,114 B2* | 3/2015 | Kim | ............ | H04L 5/0094 370/329 |
| 9,008,585 B2* | 4/2015 | Xiao | ............ | H04L 1/0027 455/67.11 |
| 9,456,372 B2 | 9/2016 | Lee et al. | | |
| 9,532,362 B2* | 12/2016 | Marinier | ............ | H04B 7/0617 |
| 9,787,383 B2* | 10/2017 | Seo | ............ | H04B 7/0626 |
| 10,135,514 B2 | 11/2018 | Kim et al. | | |
| 10,720,972 B2* | 7/2020 | Park | ............ | H04L 5/0053 |
| 2010/0035555 A1 | 2/2010 | Bala et al. | | |
| 2011/0017734 A1 | 1/2011 | Eggenreich et al. | | |
| 2011/0019776 A1 | 1/2011 | Zhang et al. | | |
| 2011/0038302 A1 | 2/2011 | Papasakellariou et al. | | |
| 2011/0044187 A1 | 2/2011 | Moulsley et al. | | |
| 2011/0141987 A1 | 6/2011 | Nam et al. | | |
| 2011/0171771 A1* | 7/2011 | Einsla | ............ | C09D 133/066 438/64 |
| 2011/0176514 A1 | 7/2011 | Yoon et al. | | |
| 2011/0176634 A1* | 7/2011 | Yoon | ............ | H04L 5/0023 375/295 |
| 2011/0177834 A1 | 7/2011 | Shin et al. | | |
| 2011/0235743 A1* | 9/2011 | Lee | ............ | H04J 11/00 375/295 |
| 2011/0237267 A1 | 9/2011 | Chen et al. | | |
| 2011/0237282 A1 | 9/2011 | Geirhofer et al. | | |
| 2011/0300890 A1 | 12/2011 | Hoshino et al. | | |
| 2011/0319109 A1* | 12/2011 | Kang | ............ | H04L 5/001 455/507 |
| 2012/0020421 A1 | 1/2012 | Larsson et al. | | |
| 2012/0051257 A1 | 3/2012 | Kim et al. | | |
| 2012/0051319 A1 | 3/2012 | Kwon et al. | | |
| 2012/0076028 A1 | 3/2012 | Ko et al. | | |
| 2012/0088458 A1 | 4/2012 | Nogami et al. | | |
| 2012/0108254 A1 | 5/2012 | Kwon et al. | | |
| 2012/0120817 A1 | 5/2012 | Khoshnevis et al. | | |
| 2012/0122502 A1 | 5/2012 | Shin et al. | | |
| 2012/0127869 A1 | 5/2012 | Yin et al. | | |
| 2012/0140708 A1 | 6/2012 | Choudhury et al. | | |
| 2012/0176939 A1* | 7/2012 | Qu | ............ | H04L 5/0023 370/255 |
| 2012/0176996 A1 | 7/2012 | Kim et al. | | |
| 2012/0188976 A1 | 7/2012 | Kim et al. | | |
| 2012/0201154 A1* | 8/2012 | Chandrasekhar | ..... | H04W 24/10 370/252 |
| 2012/0207047 A1 | 8/2012 | Liao et al. | | |
| 2012/0208547 A1* | 8/2012 | Geirhofer | ............ | H04L 5/0032 455/452.2 |
| 2012/0213261 A1* | 8/2012 | Sayana | ............ | H04L 5/0094 375/224 |
| 2012/0218968 A1 | 8/2012 | Kim et al. | | |
| 2012/0220286 A1 | 8/2012 | Chen et al. | | |
| 2012/0257515 A1* | 10/2012 | Hugl | ............ | H04B 7/0632 370/252 |
| 2012/0257553 A1 | 10/2012 | Noh et al. | | |
| 2012/0287875 A1 | 11/2012 | Kim et al. | | |
| 2013/0028138 A1 | 1/2013 | Hao et al. | | |
| 2013/0028225 A1 | 1/2013 | Ko et al. | | |
| 2013/0058307 A1 | 3/2013 | Kim et al. | | |
| 2013/0070634 A1* | 3/2013 | Gao | ............ | H04B 17/345 370/252 |
| 2013/0114430 A1* | 5/2013 | Koivisto | ............ | H04B 7/0617 370/252 |
| 2013/0114554 A1* | 5/2013 | Yang | ............ | H04W 24/10 370/329 |
| 2013/0148515 A1* | 6/2013 | Ribeiro | ............ | H04L 5/0048 370/252 |
| 2013/0208604 A1 | 8/2013 | Lee et al. | | |
| 2013/0242902 A1* | 9/2013 | Liu | ............ | H04W 24/10 370/329 |
| 2013/0250788 A1* | 9/2013 | Kim | ............ | H04J 11/0023 370/252 |
| 2013/0273931 A1 | 10/2013 | Lunttila et al. | | |
| 2013/0301467 A1* | 11/2013 | Kang | ............ | H04B 7/024 370/252 |
| 2013/0336214 A1 | 12/2013 | Sayana et al. | | |
| 2013/0343301 A1 | 12/2013 | Geirhofer et al. | | |
| 2014/0016497 A1* | 1/2014 | Seo | ............ | H04L 61/6022 370/252 |
| 2014/0044061 A1 | 2/2014 | Yue et al. | | |
| 2014/0066116 A1* | 3/2014 | Gao | ............ | H04B 17/345 455/509 |
| 2014/0086082 A1 | 3/2014 | Kim et al. | | |
| 2014/0086155 A1 | 3/2014 | Chen | | |
| 2014/0112177 A1* | 4/2014 | Park | ............ | H04B 7/0626 370/252 |
| 2014/0133336 A1* | 5/2014 | Park | ............ | H04W 24/10 370/252 |
| 2014/0286189 A1* | 9/2014 | Kang | ............ | H04B 17/345 370/252 |
| 2015/0003425 A1 | 1/2015 | Kim et al. | | |
| 2015/0078272 A1* | 3/2015 | Kim | ............ | H04L 5/0048 370/329 |
| 2015/0124717 A1 | 5/2015 | Li et al. | | |
| 2015/0249517 A1 | 9/2015 | Seo et al. | | |
| 2015/0358093 A1 | 12/2015 | Seo et al. | | |
| 2015/0381254 A1 | 12/2015 | Liang et al. | | |
| 2016/0014757 A1* | 1/2016 | Lee | ............ | H04B 17/382 370/329 |

(56) References Cited

U.S. PATENT DOCUMENTS

| | | | |
|---|---|---|---|
| 2016/0080094 | A1 | 3/2016 | Kim et al. |
| 2016/0154589 | A1 | 6/2016 | Takeda et al. |
| 2017/0006592 | A1 | 1/2017 | Hoshino et al. |

FOREIGN PATENT DOCUMENTS

| | | |
|---|---|---|
| CN | 101877608 A | 11/2010 |
| CN | 101924610 A | 12/2010 |
| CN | 102149124 A | 8/2011 |
| CN | 102291224 A | 12/2011 |
| CN | 102356577 A | 2/2012 |
| CN | 102469466 A | 5/2012 |
| CN | 102577196 A | 7/2012 |
| EP | 2624473 A2 | 8/2013 |
| EP | 2627141 A2 | 8/2013 |
| EP | 2673929 A2 | 12/2013 |
| EP | 2824849 A1 | 1/2015 |
| JP | 2011004212 A | 1/2011 |
| JP | 2011171710 A | 9/2011 |
| JP | 2012105323 A | 5/2012 |
| JP | 2012510772 A | 5/2012 |
| JP | 2013507075 A | 2/2013 |
| KR | 20100121445 A | 11/2010 |
| KR | 20120011794 A | 2/2012 |
| KR | 20120033283 A | 4/2012 |
| KR | 20130050273 A | 5/2013 |
| WO | WO 2009019079 A1 | 2/2009 |
| WO | WO 2010064842 A2 | 6/2010 |
| WO | WO 2010106725 A1 | 9/2010 |
| WO | WO 2010151050 A2 | 12/2010 |
| WO | WO 2011038410 A1 | 3/2011 |
| WO | WO 2011041544 A2 | 4/2011 |
| WO | WO 2011041623 A1 | 4/2011 |
| WO | WO 2011041759 A1 | 4/2011 |
| WO | WO 2011054003 A1 | 5/2011 |
| WO | WO 2011074807 A2 | 6/2011 |
| WO | WO 2011085195 A1 | 7/2011 |
| WO | WO 2011085230 A2 | 9/2011 |
| WO | WO 2011115421 A2 | 9/2011 |
| WO | WO 2011160926 A1 | 12/2011 |
| WO | WO 2012008815 A2 | 1/2012 |
| WO | WO 2012094608 A2 | 7/2012 |
| WO | WO 2012109037 A2 | 8/2012 |
| WO | WO 2012109037 A3 | 11/2012 |
| WO | WO 2012155520 A1 | 11/2012 |
| WO | WO 2013025558 | 2/2013 |
| WO | WO 2013025558 A1 | 2/2013 |
| WO | WO 2013112024 A1 | 8/2013 |
| WO | WO 2013133653 A1 | 9/2013 |
| WO | WO 2013170114 A1 | 11/2013 |
| WO | WO 2013184613 A2 | 12/2013 |
| WO | WO 2013184613 A3 | 3/2014 |

OTHER PUBLICATIONS

United States Publication No. 2013/0208604, published Aug. 15, 2013.
ZTE,Consideration for network assisted receiver enhancement, 3GPP Tdoc R1-131061, 3GPP TSG-RAN1 #72bis, Chicago, USA, Apr. 15-19, 2013, 7 pages.
Interdigital,Analysis of Feedback Mechanisms for CoMP, 3GPP Tdoc R1-092585; 3GPP TSG RAN WG1 Meeting #57bis, Los Angeles, CA, Jun. 29-Jul. 3, 2009, 10 pages.
Fujitsu,CoMP Cell Set Configuration, 3GPP Tdoc R2-093075; 3GPP TSG-RAN WG2 Meeting #66; San Francisco, USA, May 4-8, 2009, 5 pages.
ZTE,Interference coordination for control channels under non-CA based heterogeneous deployments, 3GPP Tdoc R1-104566; 3GPP TSG RAN WG1 Meeting #62; Madrid, Spain, Aug. 23-27, 2010, 10 pages.
Interdigital Communications, LLC,Remaining Issues with Periodic Feedback for CoMP, 3GPP Tdoc R1-123402; 3GPP TSG-RAN WG1 Meeting #70; Qingdao, China, Aug. 13-17, 2012, 2 Pages.
ITRI,Periodic Feedback for CoMP with RI-Reference-Process, 3GPP Tdoc R1-125022; 3GPP TSG-RAN WG1 Meeting #71, New Orleans, USA, Nov. 12-16, 2012, 2 pages.
3rd Generation Partnership Project; Technical Specification Group Radio Access Network; Evolved Universal Terrestrial Radio Access (E-UTRA); Multiplexing and channel coding (Release 10), 3GPP TS 36.212 V10.1.0, Mar. 2011, 76 pages.
3rd Generation Partnership Project; Technical Specification Group Radio Access Network; Evolved Universal Terrestrial Radio Access (E-UTRA); Physical Channels and Modulation (Release 10), 3GPP TS 36.211 V10.1.0, Mar. 2011, 103 pages.
International Search Report and Written Opinion, PCT Application No. PCT/US14/36424, dated Mar. 17, 2015, 16 pages.
Texas Instruments, Advanced DL CoMP Schemes and Related Feedback Support, 3GPP Tdoc R1-093998; 3GPP TSG RAN WG1 Meeting #58 bis; Miyazaki, Japan, Oct. 12-16, 2009, 2 pages.
LTE; Evolved Universal Terrestrial Radio Access (E-UTRA); Physical layer; Measurements (3GPP TS 36.214 version 10.1.0 Release 10), ETSI TS 136 214 v10.1.0, Apr. 2011, 15 pages.
Samsung,Multi-Cell Periodic CSI Reporting for DL CA, 3GPP Tdoc R1-113076; 3GPP TSG RAN WG1 Meeting #66bis; Zhuhai, China, Oct. 10-14, 2011, 4 pages.
3rd Generation Partnership Project; Technical Specification Group Radio Access Network; Evolved Universal Terrestrial Radio Access (E-UTRA); Physical Channels and Modulation (Release 11), 3GPP TS 36.211 V11.2.0, Feb. 2013, 109 pages.
Ericsson et al., Network Assistance for Interference Cancellation in Cell Range Expansion for Heterogeneous Networks, 3GPP Tdoc R1-131547; 3GPP TSG RAN WG1 Meeting #72bis, Chicago, USA, Apr. 15-19, 2013, 8 pages.
Media Tek et al., Study on Network-Assisted Interference Cancellation and Suppression for LTE, 3GPP Tdoc RP-130404; 3GPP TSG RAN Meeting #59, Vienna, Austria, Feb. 26-Mar. 1, 2013, 7 pages.
Huawei et al., Proposal for specification of PDSCH Muting, 3GPP Tdoc R1-105132, 3GPP TSG RAN WG1 meeting #62bis, Xi'an, China, Oct. 11-15, 2010, 6 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), 3GPP TS 36.300 V11.1.0, Mar. 2012, 194 pages.
New Postcom, Considerations on interference measurement resource for CoMP, 3GPP Tdoc R1-122367; 3GPP TSG RAN WG2 Meeting #69; Prague, Czech Republic, May 21-25, 2012, 5 pages.
Samsung,Support for Increased CSI Feedback Payloads in PUCCH, 3GPP Tdoc R1-103642; 3GPP TSG RAN WG1 Meeting #61bis; Dresden, Germany, Jun. 28-Jul. 2, 2010, 3 pages.
Huawei, 3GPP Tdoc R1-092364; "Consideration on CSI-RS design for CoMP and text proposal to 36.814", 3GPP TSG RAN WG1 Meeting #57bis, Jun. 29-Jul. 3, 2009, Los Angeles, USA, 9 pages.
3rd Generation Partnership Project; Technical Specification Group Radio Access Network; Evolved Universal Terrestrial Radio Access (E-UTRA); Physical layer procedures (Release 11), 3GPP TS 36.213 V11.2.0, Feb. 2013, 173 pages.
3rd Generation Partnership Project;Technical Specification Group Radio Access Network;Evolved Universal Terrestrial Radio Access (E-UTRA);Physical layer procedures (Release 9), 3GPP TS 36.213 V9.0.1, Dec. 2009, 79 pages.
3rd Generation Partnership Project; Technical Specification Group Radio Access Network; Evolved Universal Terrestrial Radio Access (E-UTRA); Physical layer procedures (Release 10), 3GPP TS 36.213 v10.5.0, Mar. 2012, 125 pages.
3rd Generation Partnership Project; Technical Specification Group Radio Access Network; Evolved Universal Terrestrial Radio Access (E-UTRA); Physical channels and modulation (Release 10), 3GPP TS 36.211 V10.0.0, Dec. 2010, 103 pages.
Samsung,CSI Collision Handling for CoMP, 3GPP Tdoc R1-123468; 3GPP TSG RAN WG1 Meeting #70, Qingdao, China, Aug. 13-17, 2012, 3 pages.
Huawei et al., CSI feedback modes for CoMP, 3GPP Tdoc R1-121946; 3GPP TSG RAN WG1 Meeting #69; Prague, Czech Republic, May 21-25, 2012, 3 pages.

(56) References Cited

OTHER PUBLICATIONS

Nokia,Achievable CQI measurement accuracy over CSI-RS, 3GPP Tdoc R1-101900; 3GPP TSG-RAN WG1 Meeting #60bis; Beijing, China, Apr. 12-16, 2010, 3 pages.
ZTE, Discussion and Evaluation on interference measurement, 3GPP Tdoc R1-113773; 3GPP TSG-RAN WG1 Meeting #67; San Francisco, USA, Nov. 14-18, 2011, 8 pages.
LTE; Evolved Universal Terrestrial Radio Access (E-UTRA); Physical layer procedures (3GPP TS 36.213 version 10.1.0 Release 10), ETSI TS 136 213 V10.1.0, Apr. 2011, 117 pages.
Nokia et al., Multi-cell CSI-RS design aspects, 3GPP Tdoc R1-093909; 3GP TSG-RAN WG1 Meeting #58bis, Miyazaki, Oct. 12-16, 2009, 11 pages.
Panasonic,PDSCH muting discussion for specification impacts, 3GPP Tdoc R1-104899; 3GPP TSG RAN WG1 Meeting #62; Madrid, Spain, Aug. 23-27, 2010, 3 pages.
Ericsson et al., RI and PMI sharing between multiple CSI processes, 3GPP Tdoc R1-122836, May 21-30, 2012, 6 pages.
3rd Generation Partnership Project; Technical Specification Group Radio Access Network; Evolved Universal Terrestrial Radio Access (E-UTRA); Multiplexing and channel coding (Release 11), 3GPP TS 36.212 V11.2.0, Feb. 2013, 82 pages.
3rd Generation Partnership Project; Technical Specification Group Radio Access Network; Evolved Universal Terrestrial Radio Access (E-UTRA); Physical layer; Measurements (Release 10), 3GPP TS 36.214 10.1.0, Mar. 2011, 13 pages.
3rd Generation Partnership Project; Technical Specification Group Access Network; Evolved Universal Terrestrial Radio Access (E-UTRA); Requirements for support of radio resource management (Release 9), 3GPP TS 36.133 V9.15.0, Mar. 2013, 522 pages.
Ericsson et al., Views on CSI RS Muting, 3GPP Tdoc R1-103843; 3GPP TSG-RAN WG1 Meeting #61bis; Dresden, Germany, Jun. 28-Jul. 2, 2010, 3 pages.
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.5.0, May 2012, 302 pages.
3rd Generation Partnership Project; Technical Specification Group Radio Access Network; Further Advancements for E-UTRA Physical Layer Aspects (Release 9), 3GPP TR 36.814 V1.3.0, Jun. 2009, 47 pages.
NTT Docomo,DL RS RAN1 Chairman's Notes, 3GPP Tdoc R1-105803; 3GPP TSG RAN WG1 Meeting #62bis; Xi'an, China, Oct. 11-15, 2010, 4 pages.
Ericsson et al., Control Signaling in Support of CoMP, 3GPP Tdoc R1-122843; 3GPP TSG-RAN WG1 Meeting #69; Prague, Czech Republic, May 21-30, 2012, 3 pages.
Fujitsu, Email discussion [69-10]: Details of collision handling and compression/multiplexing in case of 2 or more CSIs being configured in the same reporting instance for CoMP CSI feedback, 3GPP Tdoc R1-122930; 3GPP TSG RAN WG1 Meeting #69; Prague, Czech Republic, May 21-25, 2012, 30 pages.
NTT Docomo, Interference Measurement Mechanism for Rel-11, 3GPP Tdoc R1-122953; 3GPP TSG RAN WG1 Meeting #69; Prague, Czech Republic, May 21-25, 2012, 10 pages.
Samsung, Necessity of Orthogonal Inter-cell CSI-RS Patterns, 3GPP Tdoc R1-101156; 3GPP TSG RAN WG1 Meeting #60, San Francisco, USA, Feb. 22-26, 2010, 3 pages.
Nokia Siemens Network, PDSCH RE muting for CSI-RS, 3GPP Tdoc R1-105529; 3GPP TSG-RAN WG1 Meeting #62bis; Xi'an, China, Oct. 11-15, 2010, 6 pages.
3rd Generation Partnership Project; Technical Specification Group Radio Access Network; Evolved Universal Terrestrial Radio Access (E-UTRA); Requirements for support of radio resource management (Release 10), 3GPP TS 36.133 V10.14.0, Mar. 2014, 716 pages.
United States Office Action, U.S. Appl. No. 14/888,027, dated May 5, 2017, 21 pages.
Samsung, Discussion on NAICS Evaluation Assumptions, 3GPP Tdoc R1-131040, 3GPP TSG RAN WG1 #72bis, Chicago, USA, Apr. 15-19, 2013, 9 pages.
3rd Generation Partnership Project; Technical Specification Group Radio Access Network; Evolved Universal Terrestrial Radio Access (E-UTRA); Physical layer procedures (Release 10), DRAFT3GPP TS 36.213 Va.0.0, Dec. 2010, 98 pages.
R1-121946, CSI feedback modes for CoMP, Huawei et al., 3GPP TSG RAN WG1 Meeting #69.
ZTE, "CSI Feedback Modes for CoMP", 3GPP Tdoc R1-122135, 3GPP TSG RAN WG1 Meeting #69, Prague, Czech Republic, May 21-25, 2012, 5 pages.
R1-122953, Interference Measurement Mechanism for Rel-11, NTT Docomo, 3GPP TSG RAN WG1 Meeting #69.
CATT, "On CSI feedback modes for CoMP", 3GPP Tdoc R1-122039, 3GPP TSG RAN WG1 Meeting #69, Prague, Czech Republic, May 21-25, 2012, 6 pages.
Samsung, "Inter-cell CSI RS design in heterogeneous network", 3GPP Tdoc R1-101157, 3GPP TSG RAN WG1 Meeting #60, San Francisco, USA, Feb. 22-26, 2010, 2 pages.
ZTE, "Downlink control signaling for CoMP", 3GPP Tdoc R1-122143, 3GPP TSG RAN WG1 Meeting #69, Prague, Czech Republic, May 21-25, 2012, 5 pages.
"3rd Generation Partnership Project; Technical Specification Group RadioAccess Network; Evolved Universal Terrestrial Radio Access (E-UTRA)Radio Resource Control (RRC);Protocol Specification(Release 8)",3GPP Draft; R2-074005 E-UTRA RRC Specification-V030-Clean,3rd Generation Partnership Project (3GPP), Mobilecompetence Centre ; 650, Route Des Lucioles ; F-06921Sophia-Antipolis Cedex ; France, vol. RAN WG2, No. Shanghai, China; Oct. 1, 2007 , I Oct. 2007 (Oct. 1, 2007 XP050136645,[retrieved on Oct. 1, 2007].
3GPP: "3rd Generation Partnership Project; Technical Specification Group Radio Access Network; Evolved Universal Terrestrial Radio Access (EUTRA); Physical layer procedures (Release 10)",3GPP Draft; DRAFT36213-AOO, 3rd Generation Partnership Project (3GPP), Mobile Competence Centre ; 650, Route Des Lucioles ; F-06921 Sophia-Antipolis Cedex ; France, vol. RAN WGI , Dec. 21, 2010 (Dec. 21, 2010), XP050487463, [retrieved on Dec. 21, 2010].
"The Standardization Impacts of Downlink CoMP",3GPP Draft; R1-100258 The Standardization Impacts of Downlink Comp_V3, 3rd Generation Partnership Project(3GPP), Mobile Competence Centre ; 650, Route Des Lucioles ; F-06921 Sophia-Antipolis Cedex ; France, vol. RAN WG1, No. Valencia, Spain; Jan. 12, 2010, Jan. 12, 2010 (Jan. 12, 2010), XP050417940.
U.S. Appl. No. 61/761,672, filed Feb. 6, 2013.
Huawei, et al., R1-101695, TP for 3GPP TR36.814 on CoMP, 3GPP TSG RAN WG1 #60, 3GPP Server Publication Date (Mar. 1, 2010).
ZTE, "Remaining issues of Rel-10 eICIC", 3GPP Tdoc R1-110175, 3GPP TSG RAN WG1 Meeting #63bis, Dublin, Ireland, Jan. 17-21, 2011, 3 pages.
Texas Instruments, "Other configuration aspects for CoMP", 3GPP Tdoc R1-124137, 3GPP TSG RAN WG1 Meeting #70bis, San Diego, CA, USA, Oct. 8-12, 2012, 3 pages.
CATT "Consideration on interference measurement", 3GPP Tdoc R1-105921, 3GPP TSG RAN WG1 Meeting #63, Jacksonville, USA, Nov. 15-19, 2010, 4 pages.
Interdigital Communications et al.: "Configurability of Pc", 3GPP Draft; R1-124262, 3RD Generation Partnership Project (3GPP), Mobile Competence Centre ; 650, Route Des Lucioles ; F-06921 Sophiaantipolis Cedex; France vol. RAN WGI, No. San Diego, USA; Oct. 8, 2012-Oct. 12, 2012 Sep. 29, 2012(Sep. 29, 2012), XP050662168Retrieved from the Internet: URL: http://www.3gpp.org/ftp/tsg_ran/WG1 RLI /TSGRI70b/Docs/[retrieved on Sep. 29, 2012].
3rd Generation Partnership Project; Technical Specification Group Radio AccessNetwork; Evolved Universal Terrestrial Radio Access (E-UTRA); Physical layer procedures (Release 1 3GPP Standard; 3GPP-rs 36.213, 3rd Generation Partnership Project (3GPP), Mobile Competence Centre ; 650, Route Des Lucioles ; F-06921Sophia-Antipolis Cedex ; France, vol. RAN WGI, No. VI 0.5.O, Mar. 7, 2012 (Mar. 7, 2012), pp. 1-125, XP050579996.

(56) References Cited

OTHER PUBLICATIONS

CATT, "Flexible configuration of PDSCH muting", 3GPP Tdoc R1-105920, 3GPP TSG RAN WG1 meeting #63, Jacksonville, USA, Nov. 15-19, 2010, 3 pages.
New Postcom: "Discussion on Pc configuration for CoMP", 3GPP Draft; R1-124229, 3rd Generation Partnership Project (3GPP), Mobile Competence Centre ; 650, Route Des Lucioles ; F-06921 Sophia-Antipolis Cedex ; France vol. RAN WGI, No. San Diego, USA; Sep. 29-Oct 8, 2012, XP050662136, Retrieved from the Internet:URL:http://www.3gpp.org/ftp/tsg_ran/WG1 RLI /TSGRI 70b/ Docs/[retrieved on Sep. 29, 2012].
Fujitsu, "Email discussion [69-11]: FFS aspects of aperiodic CSI feedback for CoMP," 3GPP Tdoc R1-122931, 3GPP TSG RAN WG1 Meeting #69, May 21-25, 2012, 22 pages.
Huawei et al., "Aperiodic CSI feedback triggering for CoMP", 3GPP Tdoc R1-123105, 3GPP TSG RAN WG1 Meeting#70, Qingdao, China, Aug. 13-17, 2012, 3 pages.
Ericsson et al.: "Control Signaling in Support of CoMP",3GPP Draft; R1-122843, 3rd Generation Partnership Project (3GPP), Mobile Competence Centre ; 650, Route Des Lucioles ; F-06921 Sophia Antipolis Cedex ; France, vol. RAN WGI, No. Prague, Czech Republic; May 21-30, 2012, XP050601017.
Ericsson, et al., "On CSI RS Design", 3GPP Tdoc R1-100048, 3GPP TSG-RAN WG1 Meeting #59bis, Valencia, Spain, Jan. 18-22, 2010, 2 pages.
European Telecommunications Standards Institute (ETSI), TS 136 213 V9.0.1, "Evolved Universal Terrestrial Radio Access (E-UTRA), Physical Layer Procedures (3GPP TS 36.213 Version 9.0.1 Release 9)", Jan. 2010, 81 pages.

\* cited by examiner

Table 1. MIMO Capabilities in LTE/LTE-Advanced

| Downlink MIMO Techniques | | 3GPP E-UTRA | | |
|---|---|---|---|---|
| | | LTE | | LTE-Advanced |
| | | Release 8 | Release 9 | Release 10 |
| DL | SU-MIMO | Up to 4 streams | Up to 4 streams | Up to 8 streams |
| | MU-MIMO | Up to 2 users (unitary precoding) | Up to 4 users (non-unitary precoding) | Up to 4 users (non-unitary precoding) |
| UL | SU-MIMO | 1 stream | 1 stream | Up to 4 streams |
| | MU-MIMO | Up to 8 users | Up to 8 users | Up to 8 users |

FIG. 2

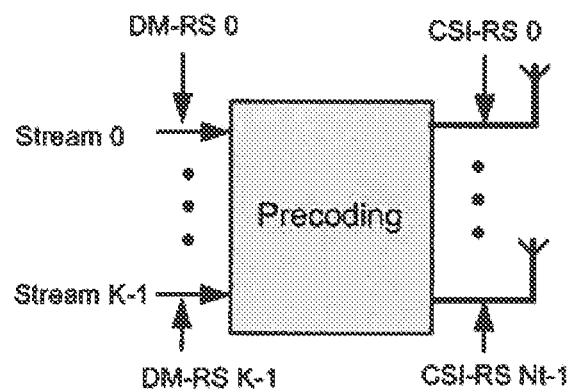
Figure 4 - UE-specific precoded DM-RS
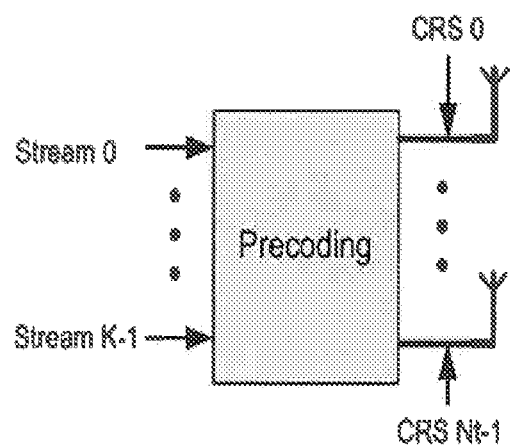
Figure 5 - Non-precoded cell-specific RS Table 2. CSI-RS configuration in normal CP

| CSI reference signal configuration | Number of CSI reference signals configured | | | | | |
|---|---|---|---|---|---|---|
| | 1 or 2 | | 4 | | 8 | |
| | $(k', l')$ | $n_s \bmod 2$ | $(k', l')$ | $n_s \bmod 2$ | $(k', l')$ | $n_s \bmod 2$ |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |

Frame structure type 1 and 2

FIG. 10

Table 3. Transmission modes in LTE/LTE-A

| Transmission mode (TM) | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br><br>Closed-loop spatial multiplexing with up to 8 layer transmission, ports 7-14 (see subclause 7.1.5B) |

FIG. 12

Table 4. Reporting modes in LTE/LTE-A

| Scheduling Mode | Periodic CSI reporting channels | Aperiodic CSI reporting channel |
|---|---|---|
| Frequency non-selective | PUCCH | |
| Frequency selective | PUCCH | PUSCH |

FIG. 13

Table 5. Rel-8/Rel-9 Details of CSI feedback according to Reporting Modes

| Transmission Mode | Aperiodic Feedback | Periodic Feedback |
|---|---|---|
| 1 | | Mode 1-0: WB CQI |
| 2 | Mode 2-0: UE selected sub band CQI: WB CQI + CQI over M best subbands. | Mode 2-0: UE Selected sub band CQI: WB CQI + UE reports CQI in preferred subband in each BW part, one BW part in each reporting opportunity. |
| 3 | | |
| 7 | Mode 3-0: high layer(HL) configured subband CQI: WB CQI + subband CQI. | |
| 8 | Notes: CQI for first CW only, No PMI | Notes: CQI for first CW only, No PMI |
| 4 | Mode 1-2: WB CQI / Multiple PMI: CQI for each CW; PMI for each subband. | Mode 1-1: WB CQI / Single PMI |
| 6 | Mode 2-2: UE selected sub band CQI / Multiple PMI: CQI per CW and PMI, both over full BW and M best subbands. | Mode 2-1: UE selected subband CQI / Single PMI ($N_{RB}^{DL} > 7$ only): WB CQI/PMI + UE reports CQI in preferred subband in each BW part |
| 8 | Mode 3-1: HL configured sub band CQI / Single PMI: WB CQI + subband CQI, both per CW. | |
| 5 | Mode 3-1: HL configured sub band CQI / Single PMI (see above) | |

FIG. 14

Table 6. CSI-RS configuration pair (N=2) for 2Tx and 4Tx in normal CP

| CSI-RS configuration pair | CSI-RS configuration pair according to the number of CSI-RS ports | | | | |
|---|---|---|---|---|---|
| | 1 or 2 | | 4 | | |
| | 1st | 2nd | 1st | | 2nd |
| 0 | 0 | 10 | 0 | | 5 |
| 1 | 1 | 12 | 1 | | 6 |
| 2 | 2 | 14 | 2 | | 7 |
| 3 | 3 | 16 | 3 | | 8 |
| 4 | 4 | 18 | 4 | | 9 |
| 5 | 5 | 11 | | | |
| 6 | 6 | 13 | | | |
| 7 | 7 | 15 | | | |
| 8 | 8 | 17 | | | |
| 9 | 9 | 19 | | | |

Frame structure type 1 and 2

FIG. 20

INTERFERENCE MEASUREMENT IN WIRELESS NETWORKS

CROSS REFERENCE TO RELATED APPLICATIONS

This application is a continuation of U.S. patent application Ser. No. 15/943,426, filed on Apr. 2, 2018, which is a continuation of U.S. patent application Ser. No. 15/275,852, filed on Sep. 26, 2016, now abandoned, which is a continuation of U.S. patent application Ser. No. 13/572,142, filed on Aug. 10, 2012, now issued as U.S. Pat. No. 9,456,372, which claims the benefit of U.S. Provisional Patent Application No. 61/523,278, titled "Methods, Systems and Apparatuses for Interference Measurement in Wireless Networks", filed on Aug. 12, 2011; U.S. Provisional Patent Application No. 61/591,168, titled "Methods, Systems and Apparatuses for Interference Measurement in Wireless Networks", filed on Jan. 26, 2012; U.S. Provisional Patent Application No. 61/644,936, titled "Methods, Systems and Apparatuses for Interference Measurement in Wireless Networks", filed on May 9, 2012; and U.S. Provisional Patent Application No. 61/667,379, titled "Methods, Systems and Apparatuses for Interference Measurement in Wireless Networks", filed Jul. 2, 2012, the contents of all the applications being hereby incorporated by reference herein in their respective entirety, for all purposes.

BACKGROUND

Embodiments recognize that multiple antenna transmission may be provided in LTE/LTE-Advanced for various purposes, including peak system throughput enhancement, to extend cell coverage and high Doppler support. Single-user MIMO (SU-MIMO) may increase a peak/average user equipment (UE) (or wireless transmit/receive unit (WTRU)) throughput, while multi-user MIMO (MU-MIMO) may improve a peak/average system throughput by exploiting multi-user diversity gain, for example.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate methods and devices configured to perform such methods, such as a wireless transmit/receive unit (WTRU) that may comprise a processor. In one or more embodiments, the processor may be configured, at least in part to identify one or more interference measurement resource elements that may be received from one or more transmission points. The processor may be further configured to perform interference measurement estimation based at least in part on energy associated with the identified one or more interference measurement resource elements. Also, the processor may be configured to generate channel state information (CSI) based at least in part on the one or more interference measurement estimation. And the processor may be configured to transmit the CSI to at least one of the one or more transmission points. In one or more embodiments, the one or more interference measurement resource elements may be received as part of a set of resource elements. Embodiments contemplate that the set of resource elements may further include empty resource elements. In one or more embodiments, the processor may be further configured to perform rate-matching based at least in part on the empty resource elements.

Embodiments contemplate methods and devices configured to perform such methods, such as a wireless transmit/receive unit (WTRU) that may comprise a processor. In one or more embodiments, the processor may be configured, at least in part to identify one or more interference measurement resource elements received from one or more transmission points. The processor may also be configured to identify one or more non-interference measurement resource elements received from the one or more transmission points. One or more embodiments contemplate that the processor may be configured to identify at least one type of channel state information (CSI). The processor may also be configured to perform interference measurement estimation based at least in part on energy associated with the one or more identified interference measurement resource elements, energy associated with the one or more non-interference measurement resource elements, and the type of CSI. The processor may also be configured to generate channel state information (CSI) for the identified type of CSI, based at least in part on the interference measurement estimation. And the processor may also be configured to transmit the CSI to at least one of the one or more transmission points. In one or more embodiments, at least one of the one or more non-interference measurement resource elements may be a non-zero-power channel state indicator reference signal (CSI-RS). And in one or more embodiments, the processor may be further configured to apply at least one of a linear or logarithmic value to the interference measurement estimation.

BRIEF DESCRIPTION OF THE DRAWINGS

A more detailed understanding may be had from the following description, given by way of example in conjunction with the accompanying drawings wherein:

FIG. 2 is a chart illustrating a table listing exemplary multiple-input-multiple output (MIMO) capabilities of LTE/LTE-Advanced system consistent with embodiments;

FIG. 4 is a block diagram illustrating example MIMO transmitter adapted for precoding and transmitting user-equipment specific precoded demodulation reference signals (DM-RS) consistent with embodiments;

FIG. 5 is a block diagram illustrating an example MIMO transmitter adapted for transmitting cell-specific reference signals (CRS) without undergoing precoding consistent with embodiments;

FIG. 10 show a table listing CSI-RS configurations and accompanying CSI-RS RE positions in a PRB consistent with embodiments;

FIG. 12 shows a table listing transmission modes operable in LTE and LTE Advanced Systems consistent with embodiments;

FIG. 13 shows a table listing Reporting Modes operable in LTE/LTE-A consistent with embodiments;

FIG. 14 shows a table listing details of exemplary CSI feedback according to reporting modes consistent with embodiments;

FIG. 20 shows a table listing various exemplary CSI-RS configuration pairs consistent with embodiments;

DETAILED DESCRIPTION

Figure 1A:
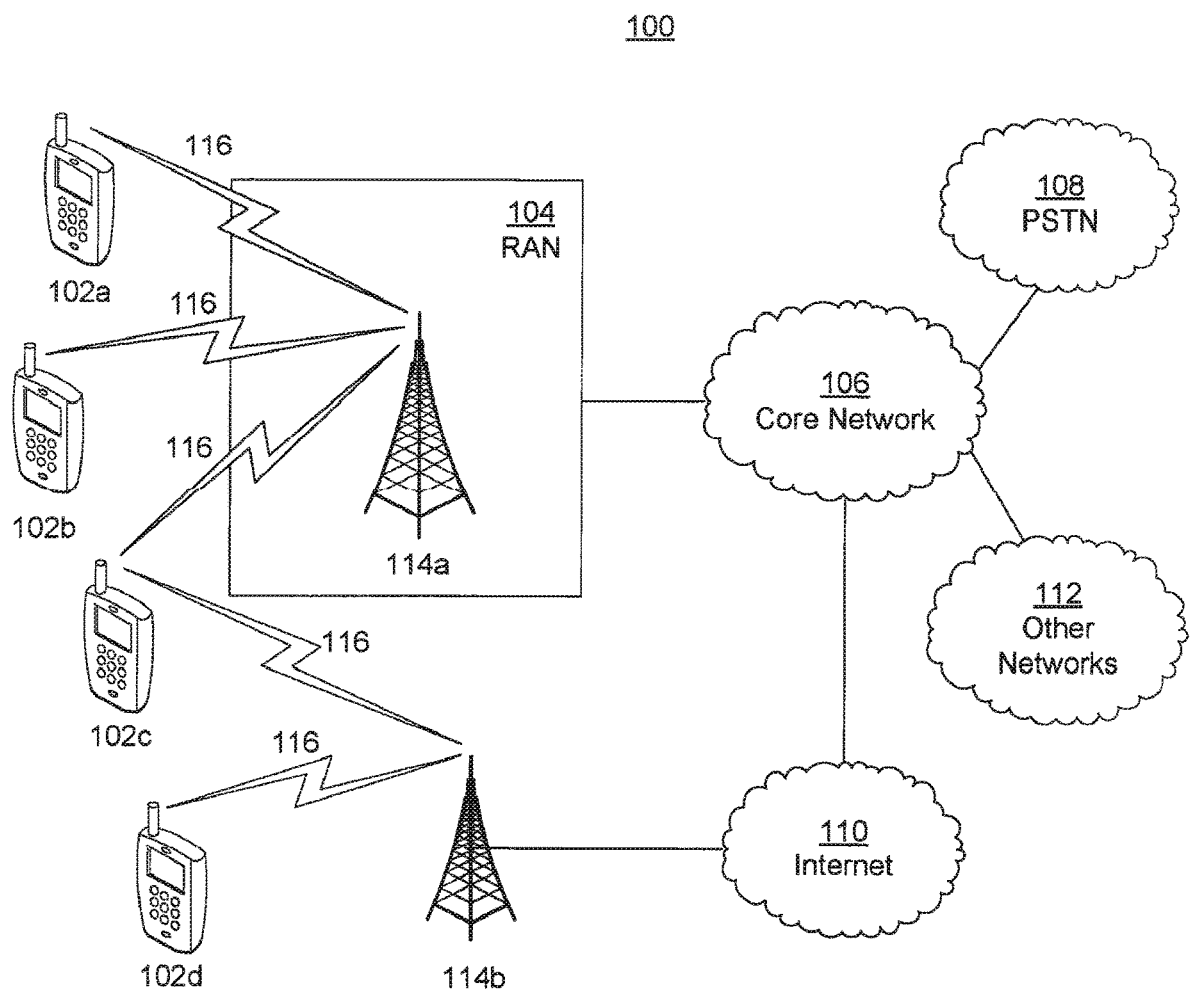
FIG. 1A is a diagram of an example communications system in which one or more disclosed embodiments may be implemented.

A detailed description of illustrative embodiments will now be described with reference to the various Figures. Although this description provides a detailed example of possible implementations, it should be noted that the details are intended to be exemplary and in no way limit the scope of the application. As used herein, the article "a" or "an", absent further qualification or characterization, may be understood to mean "one or more" or "at least one", for example. Also, as used herein, the phrase user equipment (UE) may be understood to mean the same thing as the phrase wireless transmit/receive unit (WTRU).

Systems and/or methods disclosed herein may provide and/or use resource element (RE) muting including one or more of the following: a subset of a zero-power CSI-RS configuration; a multiple IM-CSI-RS configuration; almost Blank Subframe (ABS) subframes for a macro UE; a subset of reserved PRBs for an enhanced downlink control channel; a set of E-PDCCH REs in a PRB configured for an enhanced downlink control channel; a reserved CCE in a legacy PDCCH region; a reserved enhanced CCE (E-CCE) in an enhanced downlink control channel; and the like are contemplated.

In additional embodiments, systems and/or methods disclosed herein may also provide and/or use CSI-RS pattern enhancement and a CSI-RS configuration including a PDSCH-to-CSI-RS power ratio (Pc).

Systems and/or methods disclosed herein may further provide and/or use a method of efficient CSI feedback; a method to enable a TP indication (e.g. an implicit and/or explicit method); a method for an adaptive PMI granularity feedback; RSRP measurement reporting for each TP; a method to improve reported rank accuracy including methods to report RI on a per-subband basis; a method to indicate presence of RI in PUCCH; a method of multiple CQI reporting in CoMP scenarios; a method of using CRS configuration information of a strongest interfering cell; a method of time domain multiple interference measurement with ABS configuration in macro-cell; a method of multiple resources combination for interference measurement; and the like According to example embodiments, systems and/or methods for providing interface measurement may be provided and/or used. For example, a UE may be configured with an interference measurement method to use with an IM resource and/or a UE may be configured with multiple IM resources and methods to measure a single interference type. Precoder assumption for measurement from NZP CSI-RS resource corresponding to interfering signal may also be provided and/or used. Additionally, a generalized CSI reporting configuration based on list of CSI-RS resources (NZP or IM) each of which may correspond to a desired signal or an interfering signal may be provided and/or used. Furthermore, varying RE positions as a function of subframe and frequency to avoid systematic collisions may be provided and/or used.

FIGS. 1A-1E are block diagrams illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (COMA), time division multiple access (TDMA), frequency division multiple access (FDMA), orthogonal FDMA (OFDMA), single-carrier FDMA (SCFDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as COMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband COMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (EU-TRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoiP) services to one or more of the WTRUs 102a, 102b, 102c, 102d. For example, the core network 106 may provide call control, billing services, mobile location based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
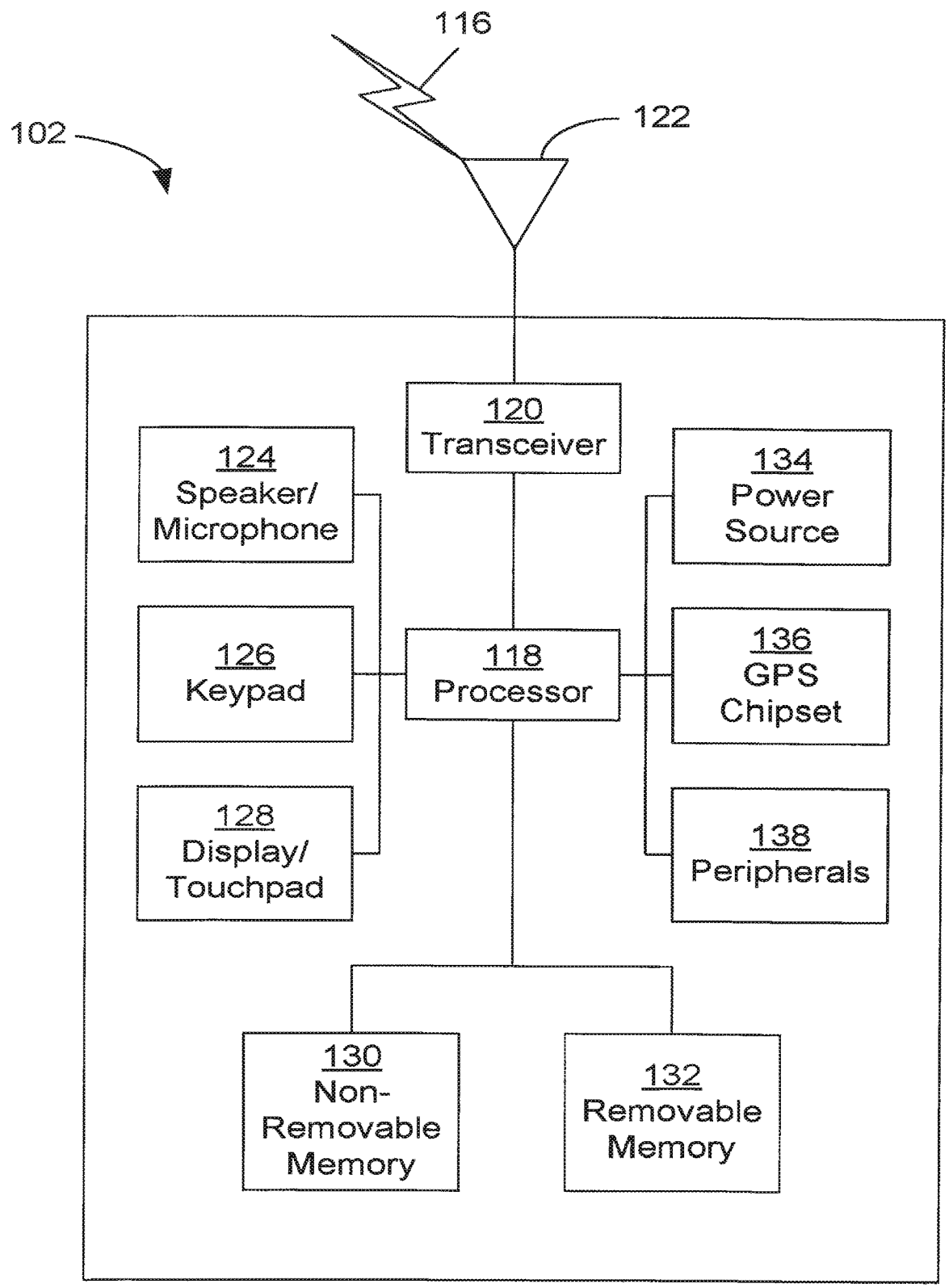
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLEO) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SO) memory card, and the like. In other embodiments, the processor 118 may access information from, and store data in, memory that is not physically located on the WTRU 102, such as on a server or a home computer (not shown). The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a BLUETOOTH® module, a frequency modulated (FM) radio unit, a digital music player, a media player, a video game player module, an Internet browser, and the like.

Figure 1C:
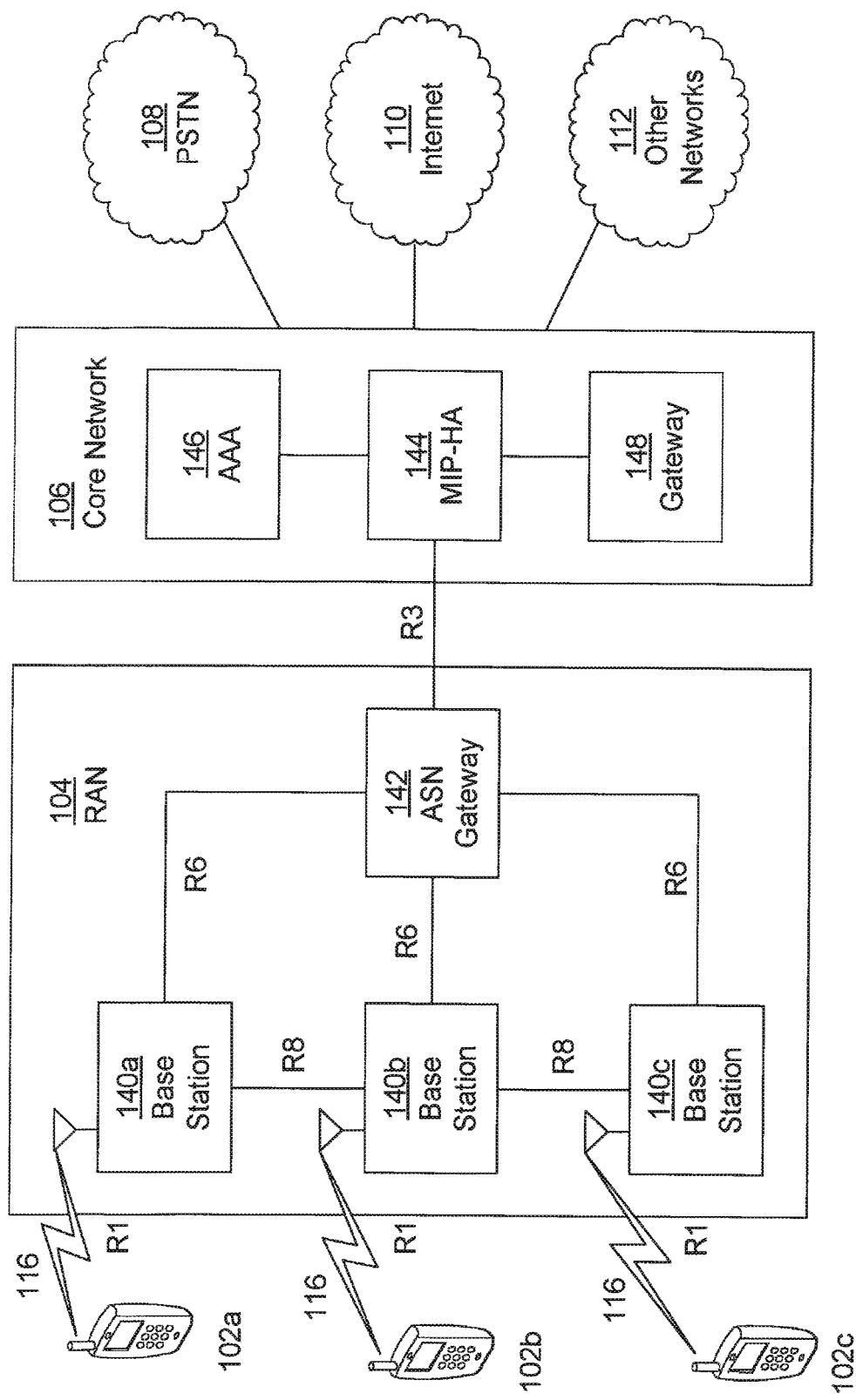
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuGS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
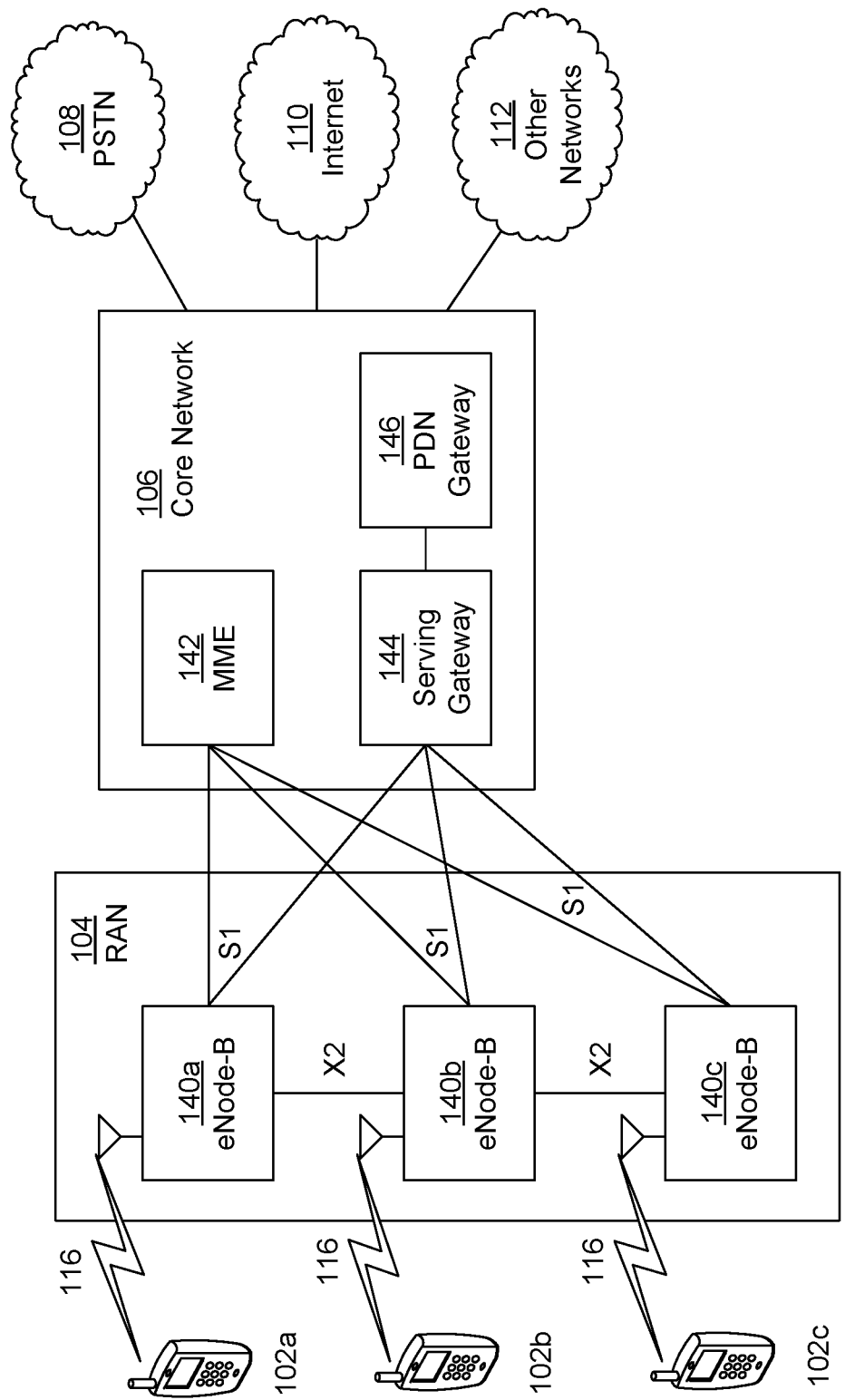
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c.

The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
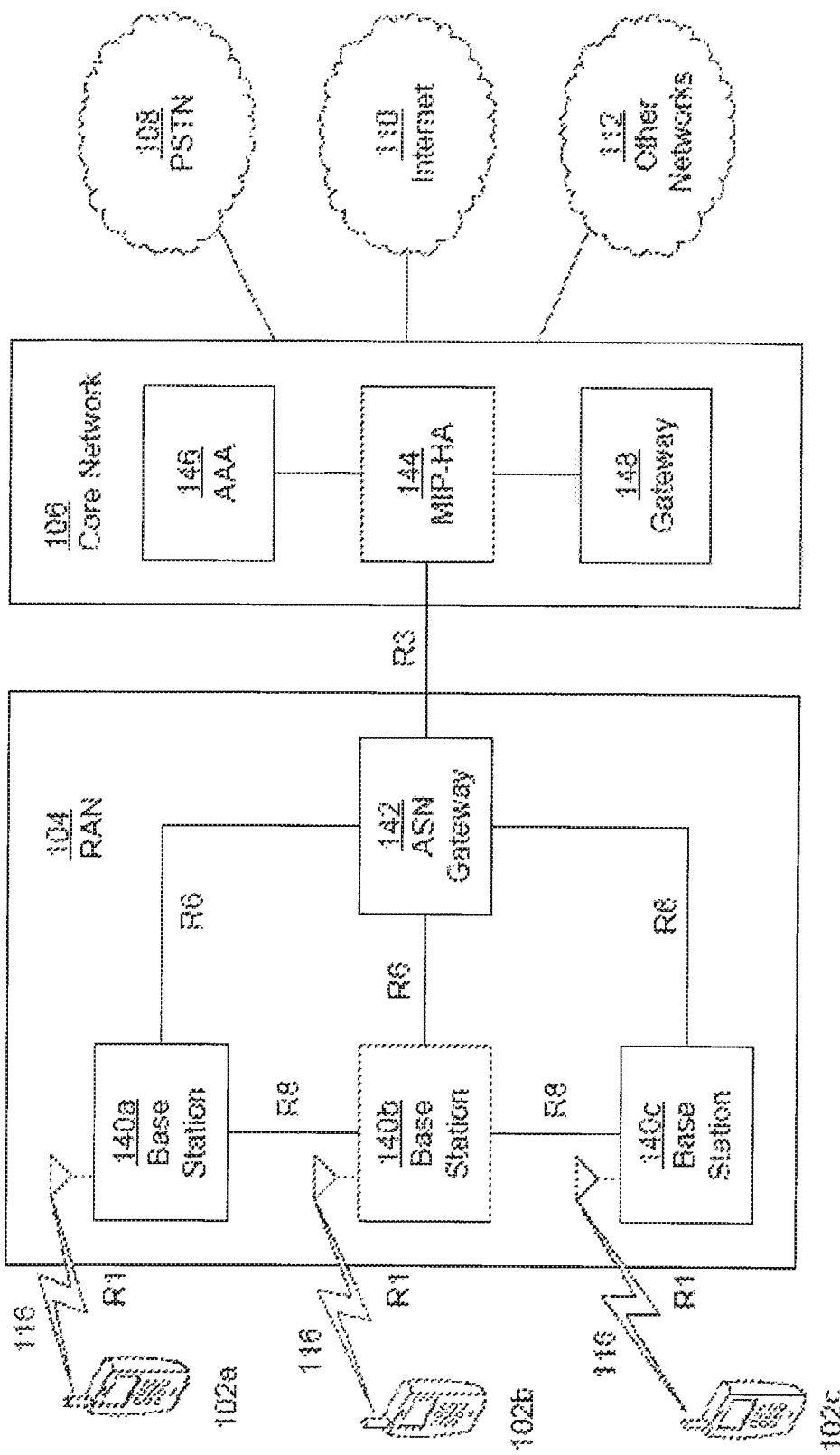
FIG. 1E is a system diagram of another example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management. The communication link between each of the base stations 140a, 140b, 140c may be defined as an R8 reference point that includes protocols for facilitating WTRU handovers and the transfer of data between base stations.

The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks. As used herein, the terms "UE" and "WTRU" may be interchangeably.

Table 1 shown in FIG. 2 lists exemplary MIMO capabilities in a LTE/LTE-Advanced system. To optimize MIMO performance according to UE channel environments, up to 9 transmission modes may be employed including transmit diversity mode, open-loop spatial multiplexing mode, and closed-loop spatial multiplexing mode. For MIMO link adaptation, a UE may report channel-state information (CSI) of multiple transmit antenna ports, which may include at least one of PMI, RI, and CQI, for example.

Figure 3:
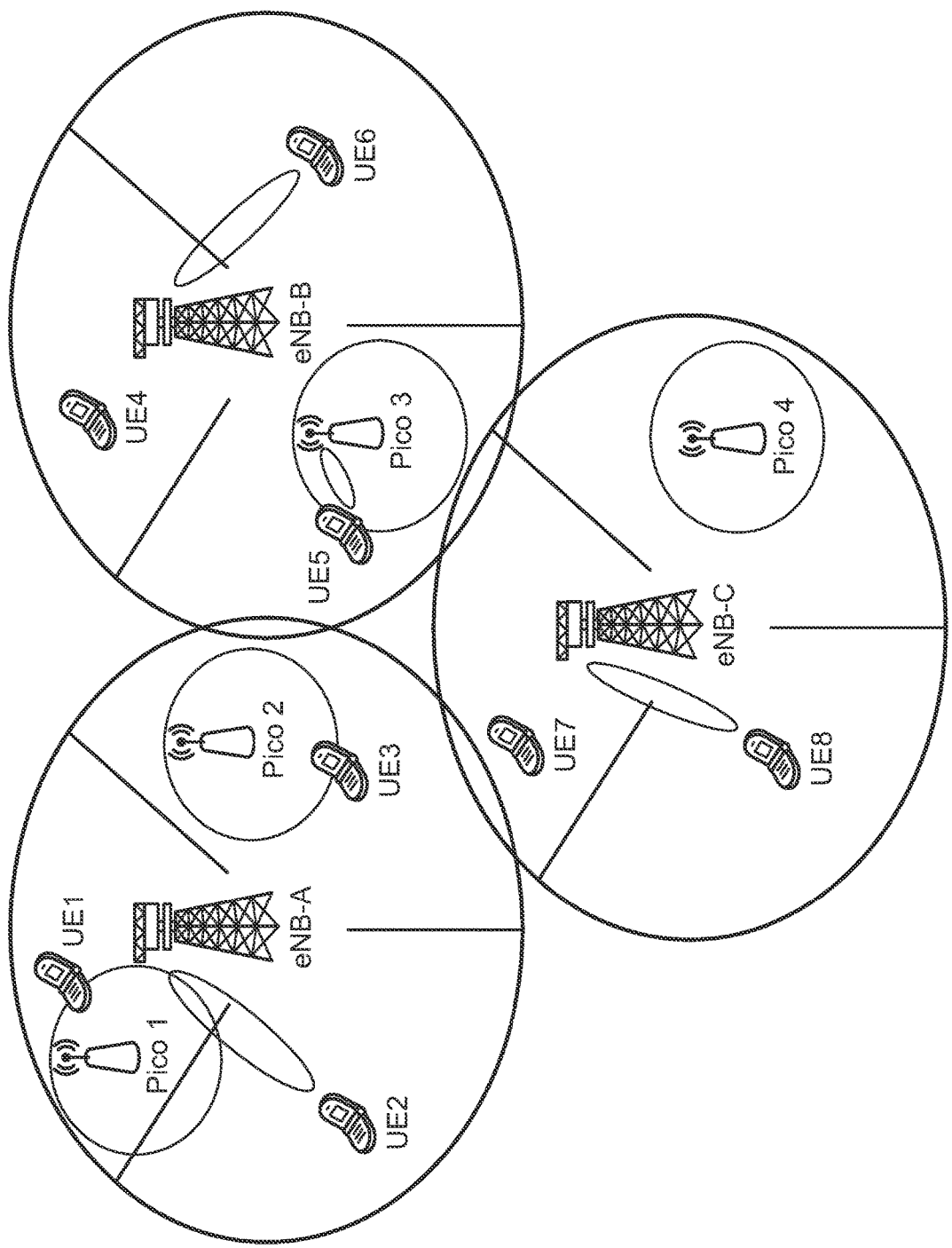
FIG. 3 is a system diagram illustrating an example heterogeneous network consistent with embodiments.

The MIMO modes (e.g. in Releases 8 and 9) may be designed for homogenous network deployment in which multiple eNB having the same coverage may be uniformly distributed. In an embodiment (e.g. Release 10), a heterogeneous network (e.g. a pico cell located within a macro cell to cover hotspot areas) may also be considered as a network deployment scenario for LTE-Advanced. An example heterogeneous network in accordance with an LTE-Advanced network deployment scenario may be illustrated in FIG. 3.

Embodiments contemplate that reference signal structures may be provided and/or used. For example, in an embodiment, reference signals may be classified to a UE-specific reference signal (hereafter "UE-RS") and a cell-specific reference signal (CRS). The UE-RS may be used for a specific UE such that the RS may be transmitted for the resources allocated to the UE (and in some embodiments perhaps only for the resources allocated to the UE). The CRS may be shared by the UEs in the cell, and as such the CRS may be transmitted in wideband manner. In addition, the UE-RS may be differentiated by usage, e.g., demodulation RS (DM-RS) and channel-state-information RS (CSI-RS).

Embodiments contemplate that DM-RS may be provided and/or used. In one or more embodiments, the DM-RS may be used for a specific UE and the RS may be typically precoded to exploit beamforming gain, among other reasons. Since the DM-RS may not be shared with other UEs in the cell, the DM-RS may be transmitted in the shared time/frequency resources allocated for the UE. The DM-RS may be used for demodulation purposes. As shown in FIG. 4, if precoded DM-RS is employed, the DM-RS may be precoded with the same precoding used for data symbol, and the same number of DM-RS sequences corresponding to the number of layers K may be transmitted. The number of layers K may be equal to or fewer than physical antenna ports $N_T$.

As shown in FIG. 4, K streams may be allocated for a UE or shared with multiple UEs. If multiple UEs may share the K streams, the co-scheduled UEs may share the same time and/or frequency resources at the same time.

Embodiments contemplate that CRS may also be provided and/or used. In one or more embodiments, the CRS may be defined for UEs in a cell, and may be used for demodulation and measurement purposes. Since the CRS may be shared by UEs, non-precoded CRS may be employed to maintain uniform cell coverage. The precoded DM-RS may have different cell coverages according to the directions resulting from beamforming. FIG. 5 shows an example of MIMO transmitter for non-precoded CRS transmission. In one or more embodiments, antenna virtualization may be used if the number of physical antenna ports and logical antenna port may be different. The CRS sequences may be transmitted for antenna ports irrespective of the number of streams.

Figure 6:
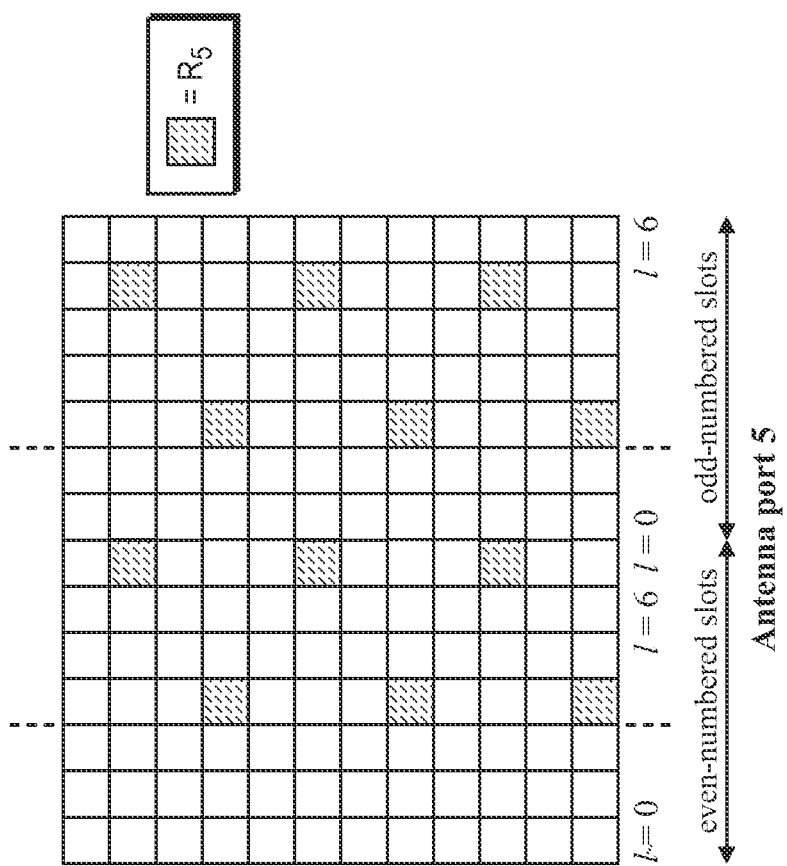
FIG. 6 shows a DM-RS for an exemplary UE/WTRU antenna port-5 normal CP operable in LTE consistent with embodiments.

Embodiments contemplate that one or more Reference Signal (RS) structures (e.g. in 3GPP LTE (Releases 8 and 9)) may also be provided and/or used. FIG. 6 shows a DM-RS (e.g., antenna port-5) defined in LTE to support non-codebook based transmission at an eNB, and one layer transmission. Since the antenna port-5 is transmitted with CRS, the RS overhead in total may become significantly increased.

Figure 7:
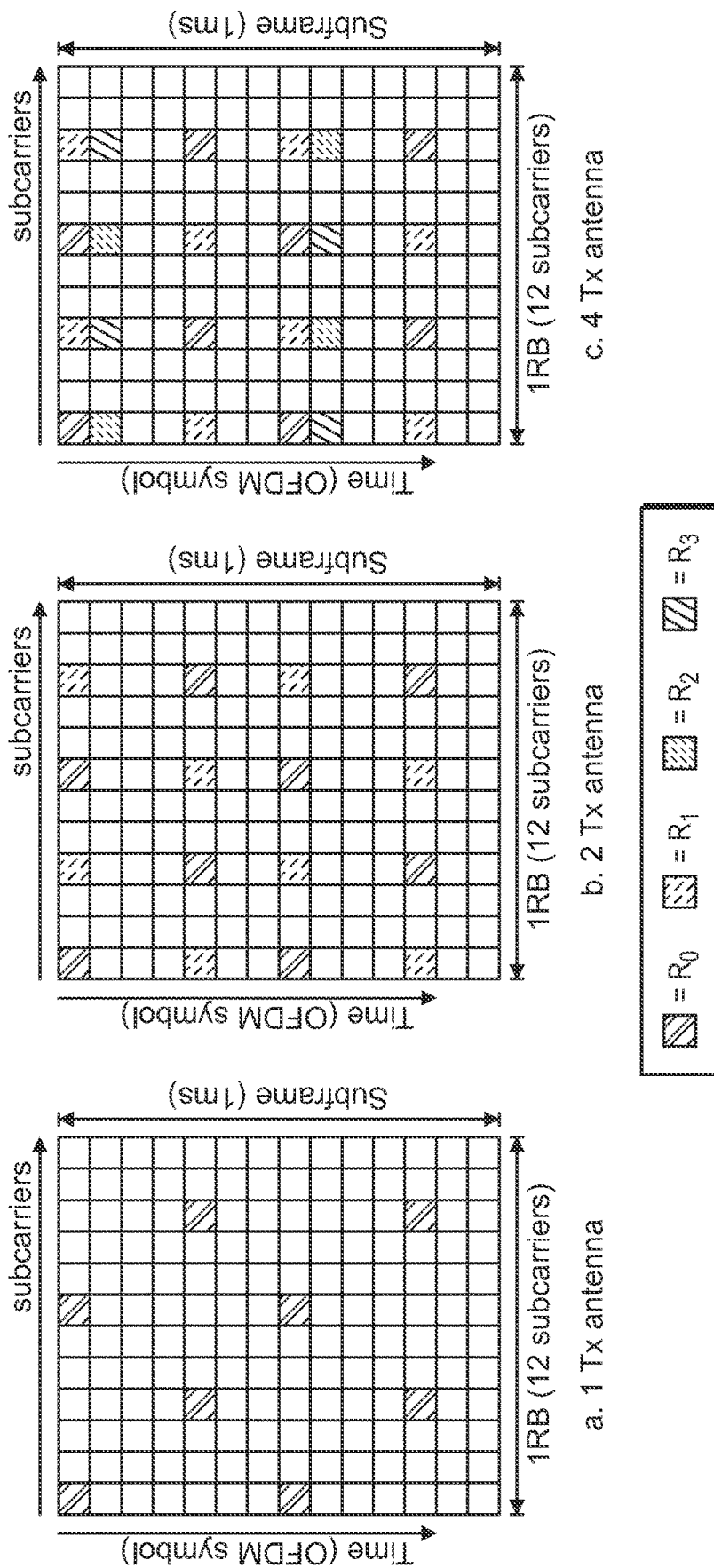
FIG. 7 shows a CRS structure for various per number antenna ports consistent with embodiments.

FIG. 7 shows the CRS structure according to various antenna ports contemplate by embodiments. The CRS patterns for some or each of the antenna ports may be mutually orthogonal in time and/or frequency domain. As shown, R0 and R1 indicate CRS for antenna port 0 and antenna port 1, respectively. To avoid interference between CRS antenna ports, among other reasons, data REs located at the RE in which CRS antenna ports may be transmitted may be muted.

One or more embodiments contemplate that a predefined sequence (e.g., Pseudo-random (PN), m-sequence and etc.) may be multiplied with downlink RS so as to minimize inter-cell interference, thus improving channel estimation accuracy from CRS. Such a PN sequence may be applied in an OFDM symbol level in a subframe and the sequence may be defined according to the cell-10, subframe number and the position of OFDM symbol. For instance, the number of CRS antenna ports may be two in an OFDM symbol comprising the CRS per PRB, and the number PRB in a LTE system may vary from 6 to 110. In this case, the total number of CRS for an antenna port in an OFDM symbol comprising RS may be $2 \times N_{RB}$ which may imply that the sequence length should be $2 \times N_{RB}$. Here, $N_{RB}$ may denote the number of RB corresponding to a bandwidth and the sequence may be binary or complex. The sequence r(m) may show the complex sequence:

$$r(m) = \frac{1}{\sqrt{2}}(1 - 2*c(2m)) + j\frac{1}{\sqrt{2}}(1 - 2*c(2m+1)),$$

$$m = 0, \ldots, 2N\frac{\max}{RB} - 1$$

where $$N\frac{\max}{RB}$$

denotes the number of RB corresponding to the maximum bandwidth in the LTE system, thus $$N\frac{\max}{RB}$$

may be 110 as mentioned above. The c may denote a PN sequence with length-31 and it may be defined with Gold-sequence. If a DM-RS may be configured, the following equation may be used:

$$r(m) = \frac{1}{\sqrt{2}}(1 - 2*c(2m)) + j\frac{1}{\sqrt{2}}(1 - 2*c(2m+1)),$$

$$m = 0, \ldots, 12N\frac{PDSCH}{RB} - 1$$

where $$N\frac{PDSCH}{RB}$$

may denote the number of RBs allocated for a specific UE, thus the sequence length may vary according to the number RBs allocated for a UE.

Figure 8:
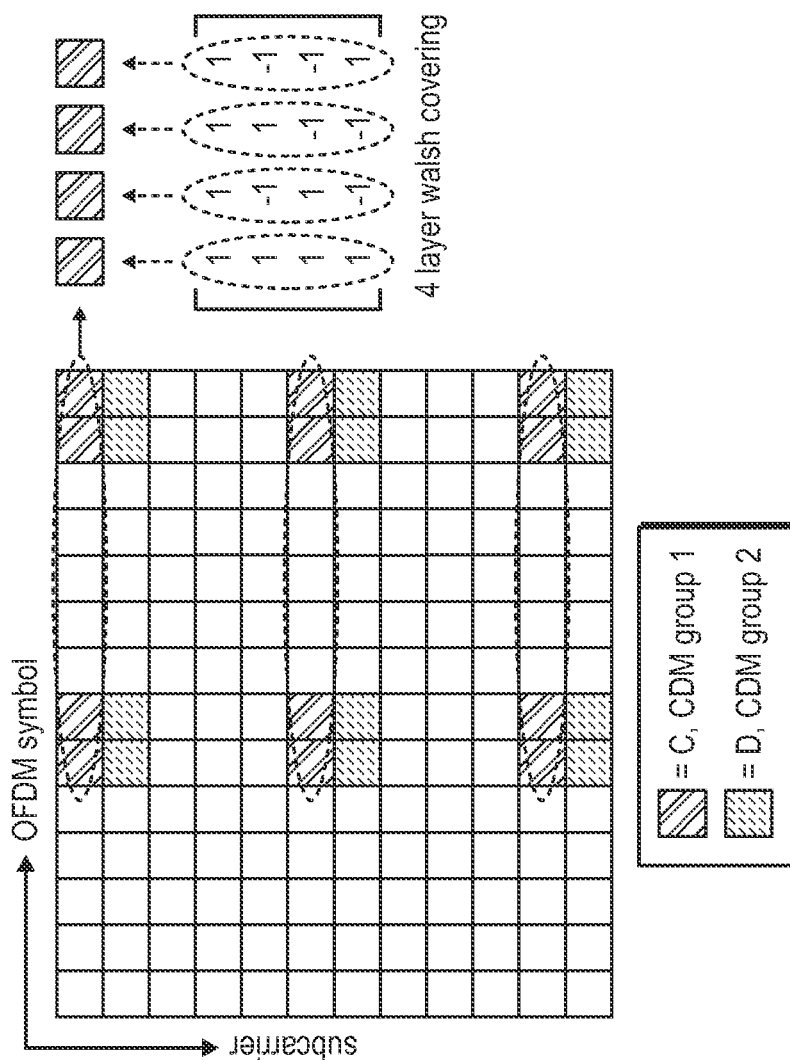
FIG. 8 shows a DM-RS pattern for supporting up to eight layers consistent with embodiments.

Embodiments contemplate that one or more Reference Signal (RS) Structure (e.g. in 3GPP LTE-A) may be provided and/or used. For example, to reduce the overall RS overhead, a DM-RS based downlink transmission may be introduced and/or provided (e.g. in Release 10 LTE-A). Since the CRS-based downlink transmission may be used to transmit RS sequences for physical antenna ports, the DM-RS based downlink transmission may reduce the RS overhead, considering that the same number of RS as the number of layer may be used for DM-RS. The number of layers may be equal to or smaller than the number of physical antenna ports. FIG. 8 shows DM-RS patterns in a PRB for regular subframe as an example.

As shown in FIG. 8, two CDM groups may be used for multiplexing up to 4 layers in each CDM group, hence up to 8 layers may be multiplexed as a maximum in this pattern. For the CDM multiplexing for each CDM group, 4×4 Walsh spreading may be used.

Figure 9:
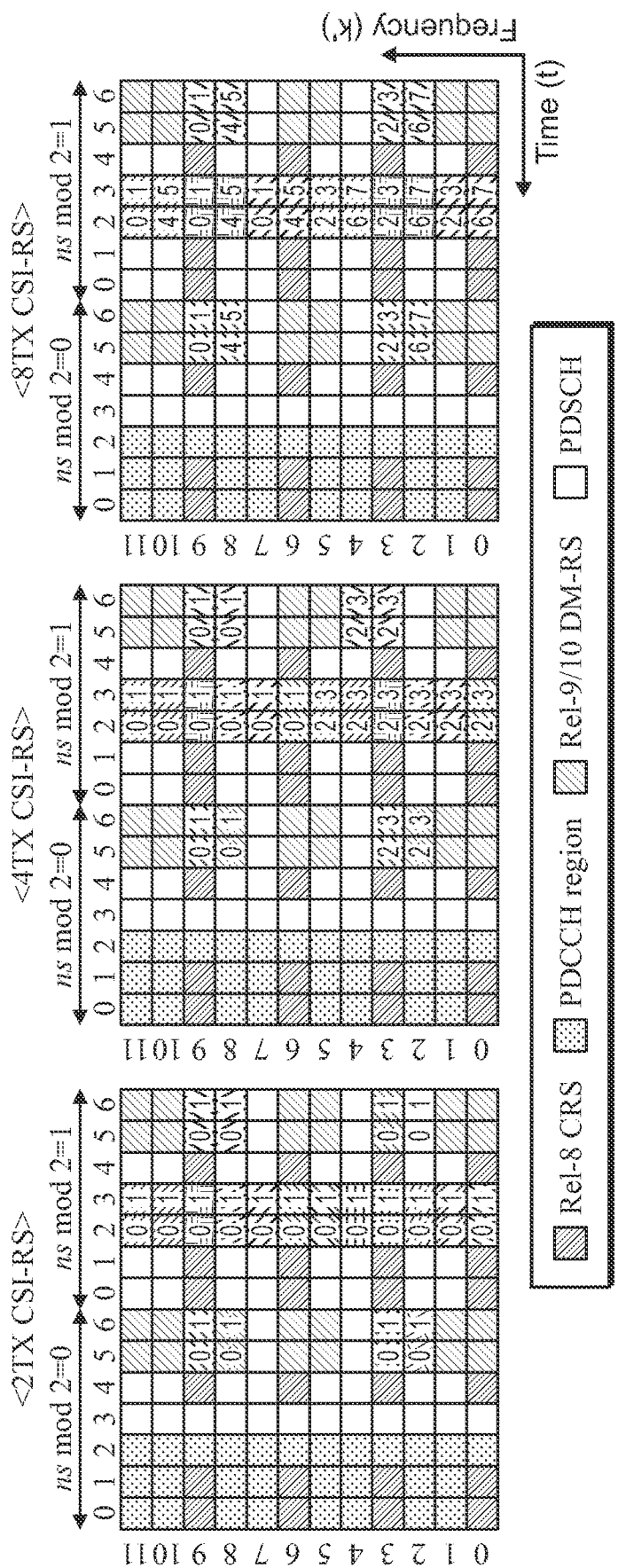
FIG. 9 shows various CSI-RS patterns reuse according to the number of ports consistent with embodiments.

Since the DM-RS may be used for a demodulation performance, a time and/or frequency sparse CSI-RS may also be introduced and/or provided for measurement purposes. The CSI-RS may be transmitted with a duty cycle {5, 10, 20, 40, 80} ms in the PDSCH region. In addition, up to 20 CSI-RS pattern reuse may be available in a subframe, as shown in FIG. 9. In FIG. 9, like type REs (e.g. with the same pattern, shading, gradient, and the like) may indicate the REs that may be members of a given set of REs for a CSI-RS configuration.

Among the CSI-RS pattern reuses, a CSI-RS configuration may be used with nonzero transmission power for a UE to measure CSI, and up to 10 4Tx based CSI-RS configuration may be used with zero transmission power in which a UE may not attempt demodulation. Table 2 of FIG. 10 lists exemplary CSI-RS configurations and accompanying the CSI-RS RE positions in a PRB.

Figure 11:
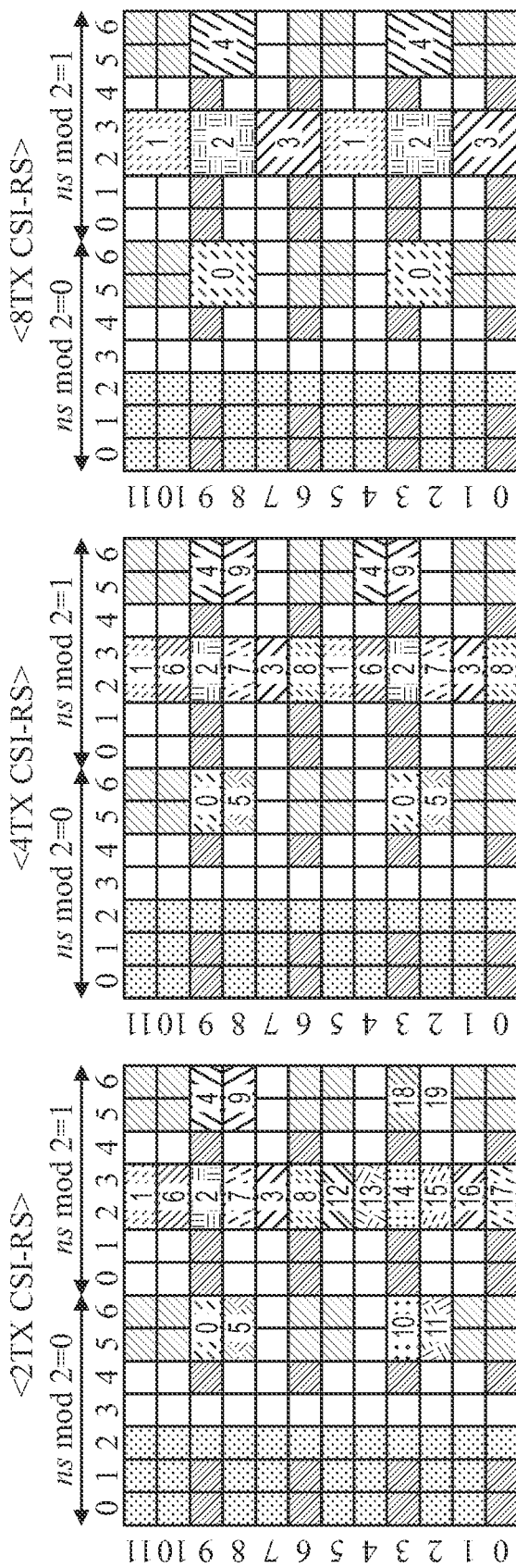
FIG. 11 shows the CSI-RS pattern according to the CSI-RS configuration number consistent with embodiments.

As defined in Table 2, the CSI-RS pattern may be identified according to a corresponding CSI-RS configuration number. FIG. 11 shows an example CSI-RS pattern according to the CSI-RS configuration number.

According to embodiments, transmission modes may be provided and/or used. For example, table 3 of FIG. 12 lists exemplary transmission modes that may be defined (e.g. in LTE and LTE-Advanced systems). Transmission modes (e.g. except for TM-7, 8, and 9) may use CRS for both demodulation and measurement. For TM-7 and 8, although DM-RS may be used for demodulation, the CRS may be used for measurement. The TM-9 may use DM-RS and CSI-RS for demodulation and measurement, respectively.

Embodiments contemplate that CSI feedback may also be provided and/or used. In one or more embodiments, two types of reporting channels may be used, such as PUCCH and PUSCH. The PUCCH reporting channel may provide robust CSI feedback, while allowing limited feedback overhead. The PUSCH reporting channel allows large amount of feedback overhead with less reliability. The PUCCH reporting channel may be used for periodic CSI feedback for coarse link adaptation, and the PUSCH reporting may be triggered aperiodically for finer link adaptation. Table 4 of FIG. 13 lists exemplary Reporting Modes in LTE/LTE-A.

Embodiments contemplate that CSI feedback may be reported in the form of rank (RI), precoder matrix index (PMI) and/or channel quality indicator (CQI). The RI and PMI may be calculated at a UE receiver by selecting rank and precoding matrix in the predefined codebook that maximizes UE throughput. The PMI and CQI may be further classified into wideband, sub-band, and UE selected sub-band. RI is reported in wideband manner. Table 5 of FIG. 14 shows further details for CSI feedback according to the transmission mode.

Figure 15:
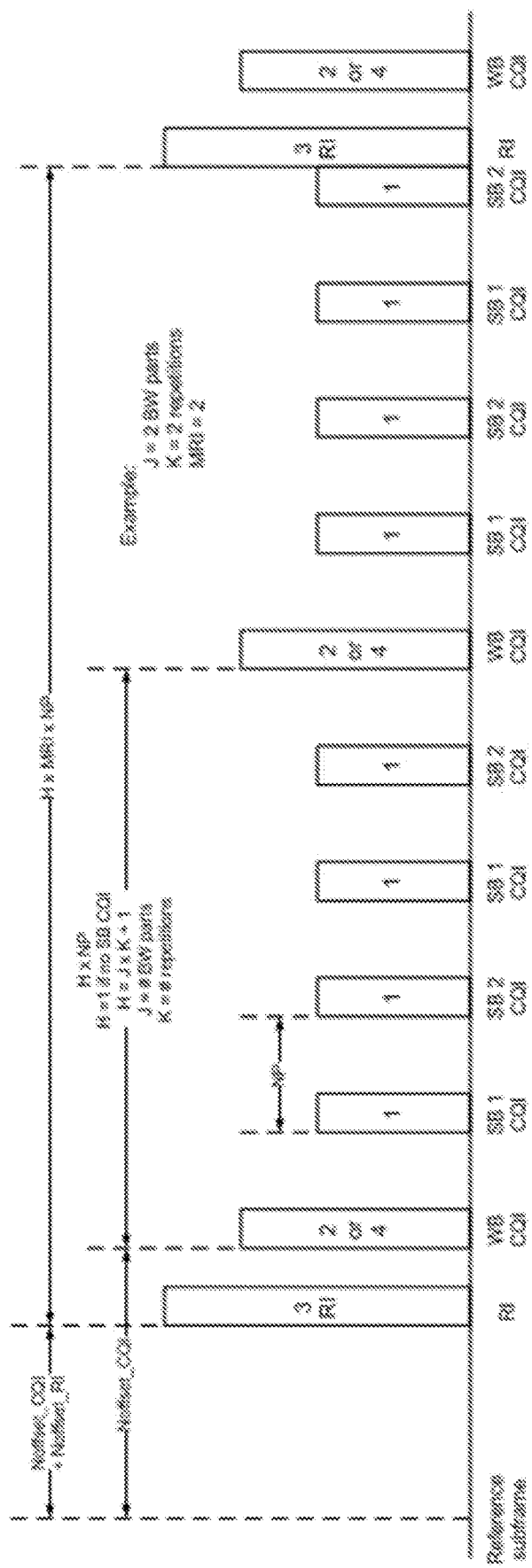
FIG. 15 shows an example periodic reporting sequence consistent with embodiments.

Periodic feedback may be transmitted on the PUCCH channel, and/or on the PUSCH channel when such a channel may exist. In an embodiment, periodic reporting may a sequence of different types of reports. For example, the following types may be defined Type 1: Subband CQI; Type 2: Wideband CQI/PMI; Type 3: RI; Type 4: Wideband CQI;

and the like. A typical reporting sequence may be shown in FIG. 15, where the number in each rectangle corresponds to a report type noted above.

Aperiodic feedback may be requested by DCI Format 0 or DCI format 4 when the CQI Request bit is set. Additionally, it may be transmitted on the PUSCH.

In one or more embodiments (e.g. in LTE Rel-10), the types of periodic PUCCH feedback may be further extended to 8 Tx antenna ports, for example, as follows: a Type 1 report supports CQI feedback for the UE selected sub-bands; a Type 1 a report supports subband CQI and second PMI feedback; a Type 2, Type 2b, and Type 2c report supports wideband CQI and PMI feedback; a Type 2a report supports wideband PMI feedback; a Type 3 report supports RI feedback; a Type 4 report supports wideband CQI; a Type 5 report supports RI and wideband PMI feedback; a Type 6 report supports RI and PTI feedback; and the like.

In a Type 6 report, a precoding type indicator (PTI) may be used for 8 transmit antenna ports, since 8 Tx precoder may be defined with a dual codebook.

Figure 16:
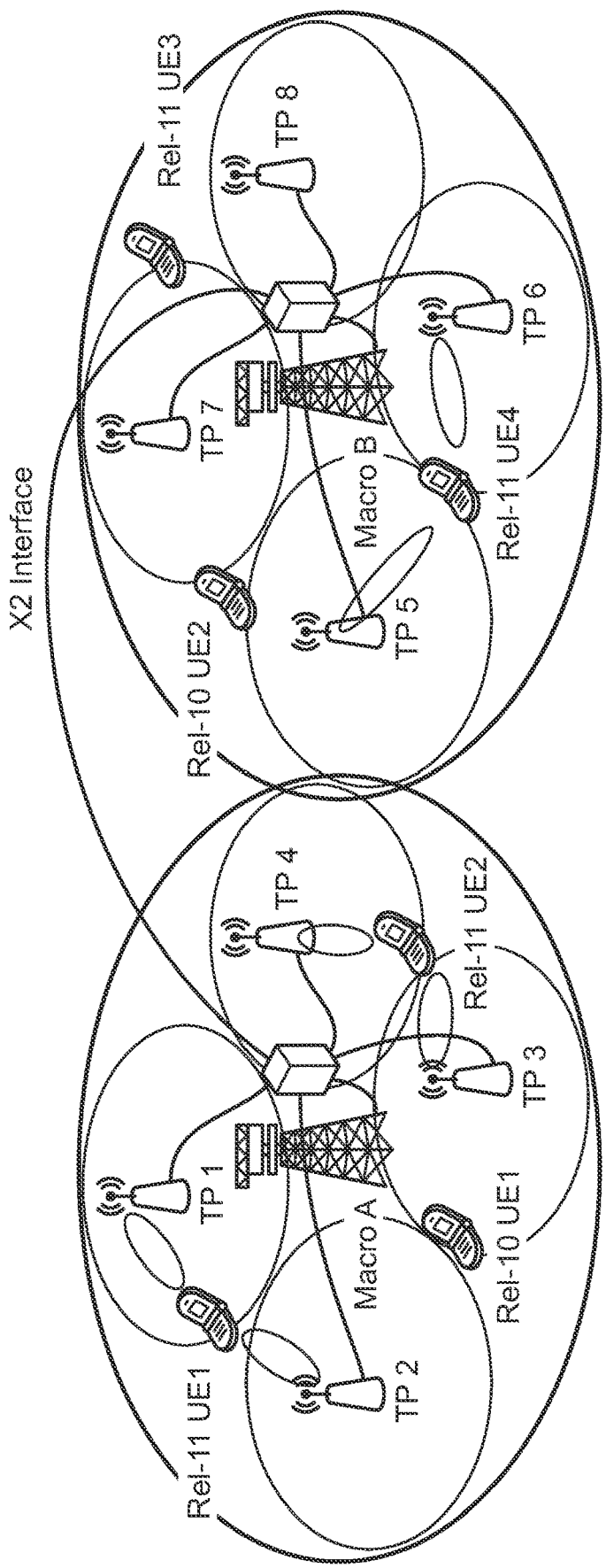
FIG. 16 shows an example distributed antenna-based network deployment consistent with embodiments.

According to an example embodiment (e.g. in Release 11), a new deployment scenario may be considered as a part of downlink MIMO enhancement. An example of such deployment may be shown in FIG. 16.

The distributed RRHs (e.g., transmission point; TP) may be considered as a separate antenna port such that a spatial multiplexing gain may be further exploited. In addition, the geographically separated antenna ports may collaborate to increase UE throughput.

A macro cell with transmission points may be deployed with various configurations according to the use of reference signals as set forth, for example, in the scenarios that follow.

In a first scenario (e.g. scenario 1), the CRS may be transmitted from transmission points, including the macro cell, and the CSI-RS may be transmitted from RRHs. The number of CRS antenna ports may be dependent on the number of antenna ports at the macro node.

In a second scenario (e.g. scenario 2), the CRS may be transmitted from the macro node, and the CSI-RS may be transmitted from distributed RRH.

Interference measurement for CSI reporting may be provided and/or used. For example, to report CSI (e.g., CQI, PMI and RI), a UE may estimate interference. If the interference measurement may be inaccurate, a UE may report a pessimistic/optimistic CQI and/or RI such that UE throughput may be degraded due to inappropriate link adaptation. If the pessimistic CQI and RI may be reported, a lower rank and MCS may be used for the UE despite when actual channel conditions for the UE may be appropriate for a higher rank and MCS, thus resulting in throughput performance loss. In example embodiments, optimistic CQI and/or RI reports may result in frequent retransmission resulting in reduced resource utilization. Accurate interference measurement may be used for optimizing the system throughput by allowing finer link adaptation.

Practical interference estimators may obtain a channel estimate per antenna port from reference signals (RS), and subtract the serving cell signal at the RS locations to perform interference covariance estimation and averaging. At least two types of interference measurement may be performed at a UE receiver, for example. For demodulation, a UE may estimate inter-cell interference (ICI) from DM-RS such that a UE may exploit interference rejection combining (IRC) gain at the receiver. Since the DM-RS may be transmitted in a localized manner, using such measured ICI may be generally unacceptable for CSI reporting. In addition, the interference measurement from DM-RS may be available when the UE may be scheduled. In view of the foregoing, interference measurement for CSI may instead be garnered from the CRS (which, as indicated above, may be transmitted periodically in wideband manner).

Embodiments contemplate one or more CRS Reuse Patterns. The CRS may provide a number of samples for interference measurement. As shown in FIG. 7, 8 REs may be used for each of the CRS port {0, 1} and 4 REs may be used for each of the CRS port {2, 3}. As such, 24 REs are available in an RB when an eNB supports 4 CRS ports, for example. The CRS may be transmitted in some or all downlink PRBs configured in the system, and in some or all downlink subframes, except MBSFN subframes. Consequently, the density of the CRS is at an acceptable level for a UE to measure ICI.

In Rel-8/9, only homogenous network scenarios were considered in system design. Consequently, the number of CRS reuse patterns supported may be up to 6 and 3 for a single antenna port and multiple antenna ports, respectively. Since the number of interfering cells may be relatively low in homogenous networks, the number of CRS reuse patterns may be acceptable for interference measurement in such homogenous networks. In heterogeneous networks, the number of interfering cells may significantly increase. As a result, 3 reuse patterns for CRS in multiple antenna case may be insufficient in number for a UE to accurately measure ICI.

CSI-RS for interference measurement may also be provided and/or used. The CSI-RS may provide a sufficient number of reuse patterns to maintain orthogonality between interfering cells in the heterogeneous network. For example, The CSI-RS may provide up to 20 reuse pattern in a subframe for 1Tx and 2Tx layers, and number of reuse patterns may increase as duty cycle increases. The CSI-RS ports (e.g., ports 0-4) may be defined logically different from the antenna ports (e.g., ports 15-22) such that a UE may not assume that CSI-RS and/or CRS experience the same interference. As such, the CSI-RS may not be well suited for interference measurement when a UE may be configured to a MIMO mode which refers CRS for CSI feedback.

Figure 17:
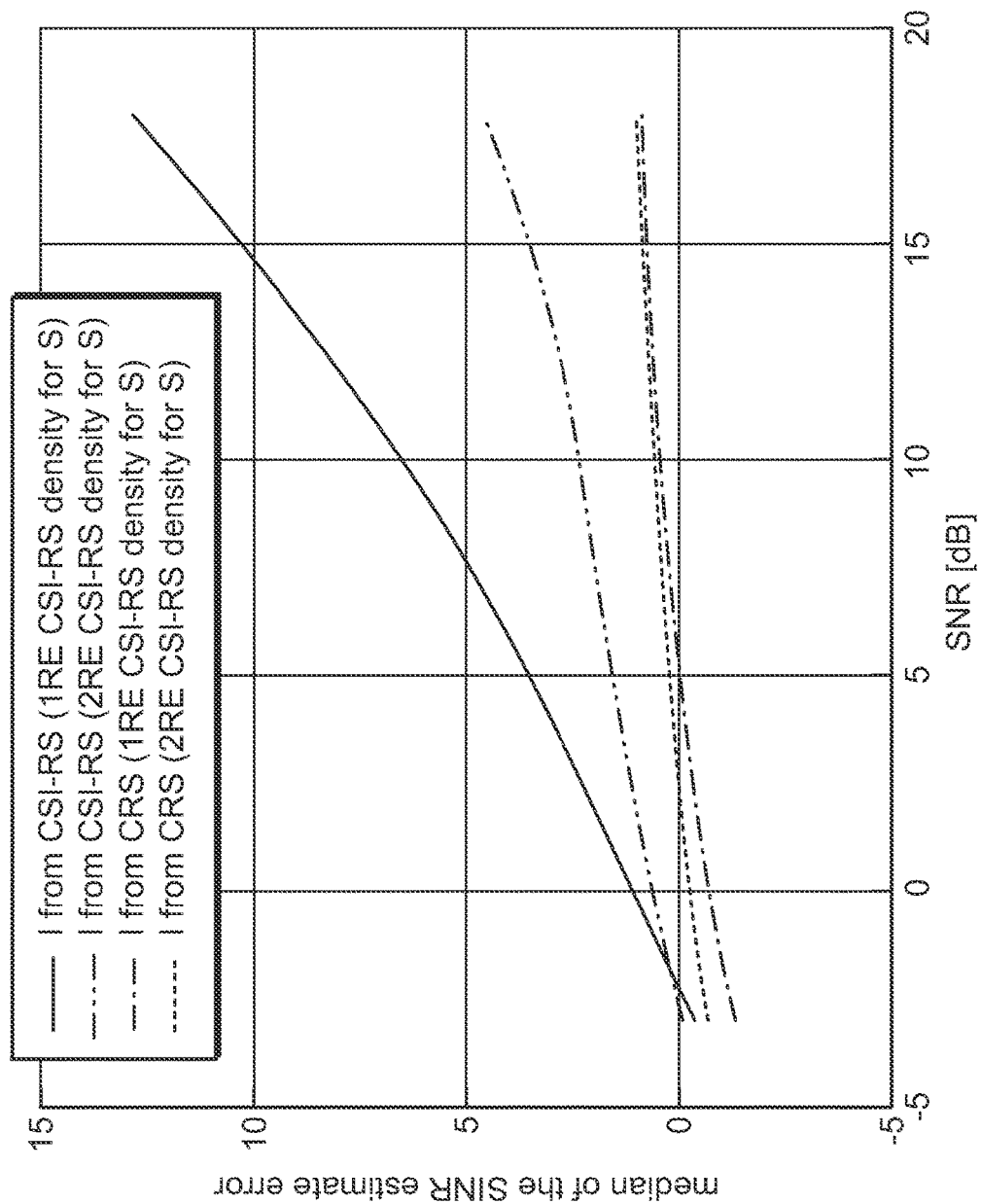
FIG. 17 shows an exemplary interference estimation accuracy according to the frequency domain RS density consistent with embodiments.

The transmission mode 9 (TM9) may use CSI-RS for CSI reporting, as indicated above. When a UE may be configured to TM-9, the CSI-RS may be used for interference measurement. The CSI-RS may provide 1 RE per port in an RB such that 4 REs may be available in an RB if 4Tx CSI-RS may be configured. Moreover, the CSI-RS is transmitted with a duty cycle {5, 10, 20, 40, 80} ms such that time averaging of interference covariance may be limited to a specific time region. Due to the limited number of time/frequency CSI-RS samples, the interference measurement from CSI-RS may be inaccurate. As shown FIG. 17, the interference estimation error of 1 RE CSI-RS sample may be degraded when compared with that of 2RE CSI-RS samples.

Embodiments contemplate that one or more distributed antenna based networks may be provided and/or used. In a distributed antenna based network, as shown in the FIG. 16, the interference measurement may be useful because a subset of antenna ports (e.g., remote radio heads; RRHs) may be involved for multiple antenna transmission to a UE, and the other antenna ports may be used for another UE at the same time. The UE may take the signals from the antenna ports used for another UE into account for interference measurement. Since the CRS should be transmitted in each of the transmission points including macro and RRHs, the CRS may be unable to differentiate one of the RRHs from another. The CSI-RS ports may be separately defined for each of the RRH, and used for channel and interference measurement. As indicated above, one or more embodiments contemplate that the sparse CSI-RS pattern may not guarantee the interference measurement accuracy. In addition, if zero-power CSI-RS may be used to guarantee measurement performance for other UEs, the interference may not be measured in the CSI-RS position.

Unlike conventional HetNet scenarios (e.g. Macro and Pico may have their own cell-ID), in distributed MIMO systems (e.g. in LTE R-10 distributed MIMO systems), the same cell-ID may be shared among Macro cell and its RRHs (also known as "deployment scenarios with geographically separated antennas"). For the above, an eNB may configure the UE to report a CSI for its most favorable TP(s) through RRC configuration/reconfiguration. A CSI-RS pattern configuration may be selected to maximize certain performance metrics such as UE throughput. In addition, in such scenarios it may be useful that the UE may report more than one type of CSI, where each type of CSI may correspond to a different assumption about whether transmission from a certain TP may contribute or not to the interference. Such flexibility may be useful to provide information to the network about the appropriate transmission parameters to use for different types of transmissions, such as a joint transmission from two TP's, a transmission from a first TP while not transmitting from a second TP, or a transmission from a first TP while transmitting to another UE from a second TP. In such an embodiment, capability of estimating different types of interference corresponding to different transmission assumptions may be provided and/or used.

Estimating different types of interference in deployment scenarios with geographically separated antennas may be described herein. When the UE may be moving within the same Macro-cell, the TP(s) for which the UE may be reporting CQI, may have stopped being a suitable (e.g. the best) TP(s) to serve the UE. A reconfiguration of the selected TP(s) may be used. As an alternative to using reconfiguration, the UE may autonomously select which TP(s) to associate with for measurements and CSI feedback. In an embodiment, methods which may allow the UE to provide an indication of which TP(s), it may be or may have associated with may be provided and/or used.

TP selection and reporting may be provided and/or used for distributed MIMO systems (e.g. deployment scenarios with geographically separated antennas). Since pure SU-MIMO may not exist (e.g. after Rel-10) due to the introduction of MU-MIMO, the eNB scheduler may be too taxed to support interference mitigation due to multiple users sharing same transmission resources. One method or technique may include using multicell zero-forcing beamforming (ZFBF) with limited feedback that base on per-cell channel quantization, for example.

In one or more embodiments (e.g. in Rel-8/9/10), precoder matrix indicator (PMI), or its equivalent to the channel direction information (CDI) which may be a local channel (e.g., the channel between the BS and the mobile station (MS) that may be in the same cell), and that of cross channels (e.g., the channels between the BS and the MS that may be in different cells) may be provided and/or used. Due to limited feedback information (e.g. in Rel-8/9/10), it may cause the rate loss for both SU-MIMO and MUMIMO. Since MU-MIMO (e.g. in Rel-10) may consider in a single transmit point, the average channel energy from one eNB to UE may be the same for transmitted data shared by the same transmission resource. This may not be the case or may not be true for DL MIMO (e.g. implemented or real-life DL MIMO), because an inherent feature of distributed MIMO channels may be asymmetry, which may indicate that the average channel energy from different Tx-points to one UE may be different. As such, the rate loss may depend on factors that may dominate the rate loss of single cell MU-MIMO. These factors may include the CSI quantization error, the number of transmit antennas, the receive SNR, and the like. The rate loss may also depend on the location of the paired UEs. The performance loss of a UE led by limited feedback may be reduced when its paired MSs may locate near their serving eNBs. This may be the case (e.g. may be true) when this UE may not locate at the cell edge.

Planning of resources that may be used for interference measurements may be disclosed herein. In an embodiment, when a UE may be configured to estimate measurements from a set of resource elements (or an interference measurement resource), the estimated interference may capture as closely as possible the interference stemming from transmissions in other cells or transmission points. This means that the network may generally avoid configuring interference measurement resources in two closely coupled cells or points systematically use a common subset of resource elements. One or more embodiments may apply random hopping between resource elements within the CSI-RS resources (e.g. Rel-10 CSI-RS resources) to avoid systematic collisions. However, it may still be possible to occasionally have collisions between neighbouring points.

CSI feedback may impact MIMO performance. For example, rank measurement at a UE may be provided and/or used. An issue related to rank reporting may include a potential mismatch between the reported rank, and the intended rank selected by the eNB scheduler. In certain cases, the eNB may decide to use MUMIMO operations and, thus, may prefer that UEs report accurate channel information for low rank transmissions. In other cases, the eNB may prefer to use SU-MIMO and, thus, may prefer to know the largest (e.g. adapted) rank the UE may support.

When there may be a mismatch in the understanding of the rank between the UE and the eNB, the eNB may use inaccurate channel information for its intended transmission mode (e.g., MU-MIMO vs. SU-MIMO). While this situation may have existed before (e.g. in previous releases of the LTE specifications), the issue may become more severe for some deployment scenarios. Furthermore, if the UE under-estimates the channel due to an inaccurate interference estimate, and incorrectly reports a low quality channel with an associated lower rank, the eNB scheduler may unnecessarily limit the user throughput.

A UE's reported rank may be inaccurate for a wideband aperiodic report. Another issue of rank reporting may be that if one of configured CSI-RS (CRS) ports and its RSRP dominate, the rank may be limited to one therefore rank-adaption is infeasible and throughput of the UE may be adversely impacted.

Embodiments contemplate one or more interference measurement techniques that may be provided and/or used. According to an embodiment (e.g. for such interference measurements), resource element (RE) muting may be used. In such an embodiment, the UE may estimate the interference generated by a set of transmission points by measuring the received energy during a certain set of resource elements (RE's). During this set of resource elements, the network may ensure that transmission points that may transmit a desired signal to the UE may not transmit (or may "mute") such that the energy detected during the set of REs may include noise and interference. In some embodiments, the network may also ensure that the other transmission points transmit during those RE's so that the energy detected during the set of REs includes the interference they generate. In one or more embodiments, empty resource elements may be those resource elements that do not contain a physical downlink shared channel (PDSCH) symbol.

Without loss of generality, a set of REs that may be used for the purpose of interference measurement may be referred to herein as "IM-CSI-RS" (or "interference measurement CSI-RS") or an "interference measurement resource" (IMR).

In an embodiment (e.g. in Rel-10), zero-power CSI-RS (e.g., RE muting) may be configured with 16-bit bitmap zero power CSI-RS based on 4 Tx CSI-RS patterns. If one or more of the zero-power CSI-RSs may be configured, a UE (e.g. a Rel-10 UE) may consider the REs configured for zero-power CSIRS as empty REs such that the UE may rate-match around the REs in its PDSCH demodulation process if scheduled, and if no further UE behaviour may be defined.

The muted REs intended for interference measurement may include at least a subset of zero-power CSI-RS. Specifically, in embodiments, the muted RE intended for interference measurement can be defined by one or more of the following.

In an embodiment, the muted RE may be defined by a subset of zero-power CSI-RS configuration. For example, since multiples of the zero-power CSI-RS may be configured based on 4 Tx, a subset of configured zero-power CSI-RS patterns (e.g., Interference Measurement CSI-RS; IM-CSI-RS or IMR) may be specified or configured for interference measurement. By way of example, if CSI-RS configuration {1, 2, 3, 4} (perhaps specified by a resourceConfig information element, for example) may be used for zero-power CSI-RS, a subset {2} may be configured as IM-CSI-RS for interference measurement. A UE may assume that the CSIRS configuration {2} may be used for interference measurement and possibly rate-matching operation, and in turn may consider the other zero-power CSI-RS configuration {1, 3, 4} as empty REs for which a UE performs rate-matching operation and no measurements operation. Additionally, independent 16-bit bitmap IC/MeasureCSI-RS may be defined in higher layer signalling to indicate IM-CSI-RS configuration. If a CSI-RS configuration may have overlapping ZeroPowerCSI-RS and IC/MeasureCSI-RS, the UE may assume the CSI-RS configuration as IM-CSI-RS. Among 16 candidates of zero-power CSI-RS patterns, a CSI-RS configuration may be used for interference measurement. In this case, 4-bit higher layer signalling, for instance a resourceConfig index, may be used to indicate IM-CSI-RS pattern.

In one or embodiments, the muted REs may be defined by multiple IM-CSI-RS or IMR configurations. For example, multiple types of IM-CSI-RS may be configured such as Type-A, Type-B, and the like, or be indexed in the configuration. A UE may measure multiple types of interference independently, and then may apply them according to the reporting types or CSI processes (e.g. assuming the UE may be configured to report multiple reporting types or CSI processes). Each type of IM-CSI-RS may have independent configurations, including, for example, a duty cycle and offset (resourceConfig, subframeConfig) and number of antenna ports.

Almost Blank Subframe (ABS) subframes for a macro UE may also be used, for example, to define the muted RE and/or for interference measurement. ABS subframes may be defined by using MBSFN subframe. A UE connected to a macro eNB that may be use a ABS subframe may assume to measure interference from the a PDSCH RE in the ABS subframe. A subset of PDSCH REs or PRBs may be defined for interference measurement. Alternatively, a subset of ABS subframe may be defined for interference measurement. One or more of the aforementioned subsets may be predefined and/or configured via higher layer signalling.

Figure 18:
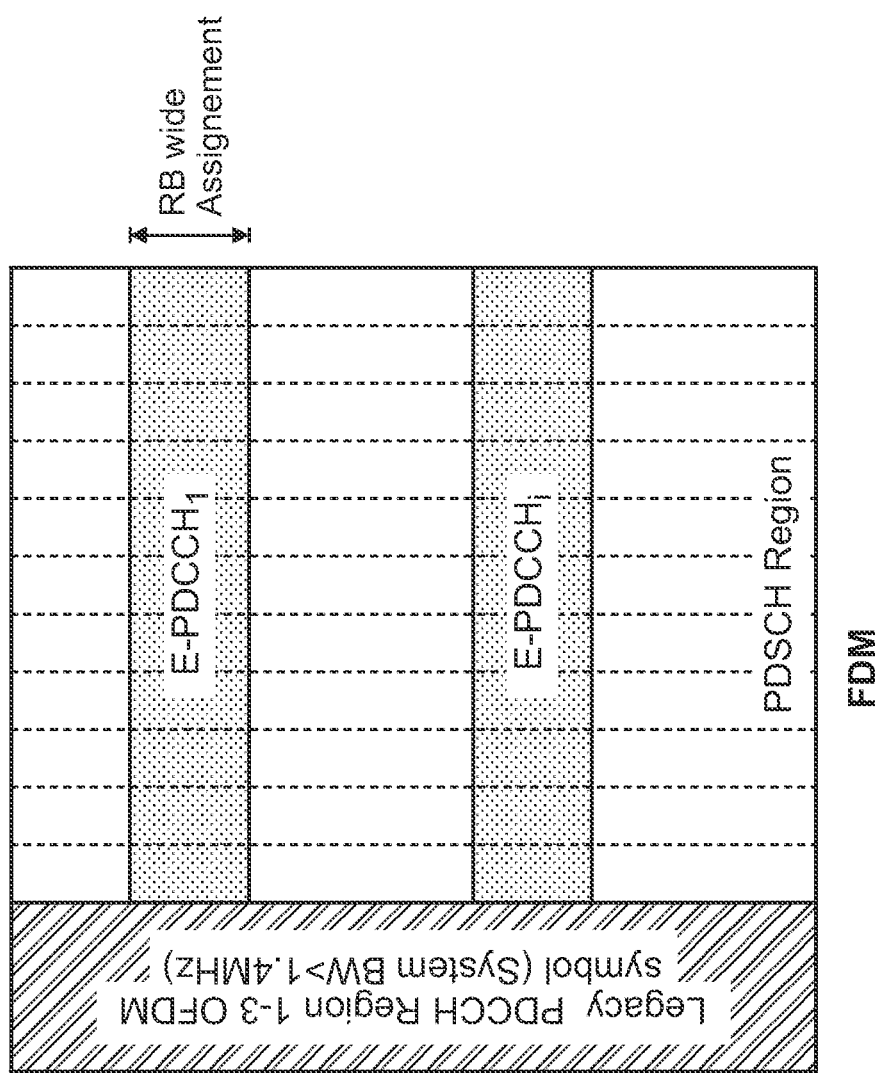
FIG. 18 shows an example E-PDCCH resource definition consistent with embodiments.

Embodiments contemplate a subset of reserved PRBs for enhanced downlink control channel (e.g. that may be used to define the muted RE and/or may be used for interference measurement). An enhanced downlink control channel (e.g., E-PDCCH) may be defined using FDM in the PDSCH region shown, for example, in FIG. 18. In the predefined E-PDCCH resources, unused E-PDCCH resources (e.g., PRBs and/or E-CCEs) may be indicated by the eNB, and the UE may estimate interference in such resources. The eNB may indicate the unused E-PDCCH resources from legacy PDCCH in either a common search space or UE-specific search space. Further, a subset of the E-PDCCH resources may be configured for interference measurement by eNB via higher layer signalling.

Figure 19:
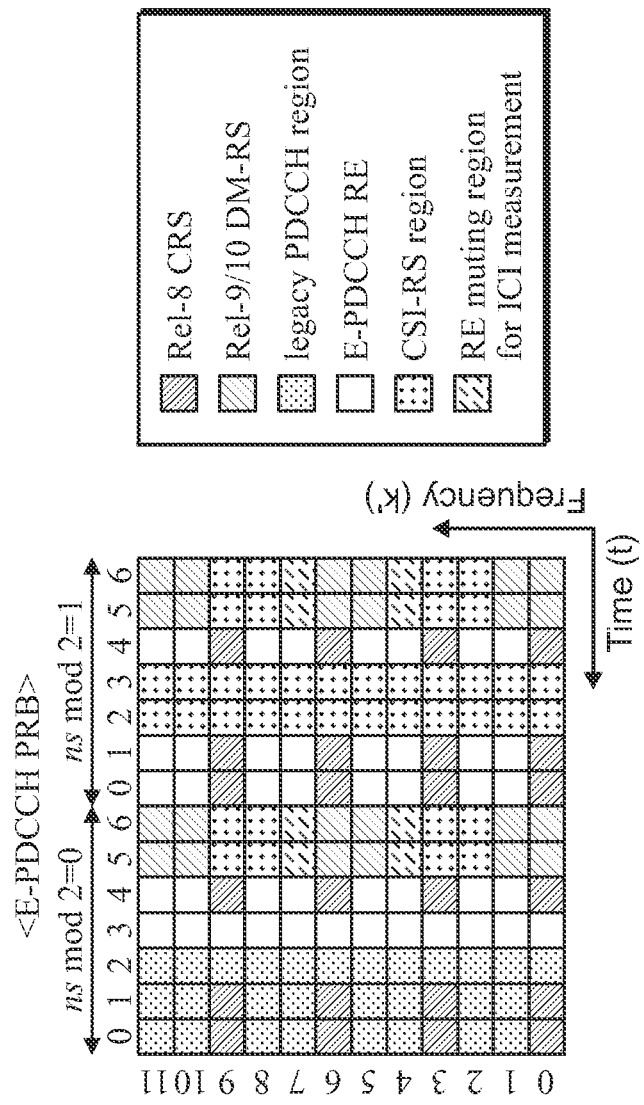
FIG. 19 shows example RE muting resources for ICI measurement configured in E-PDCCH PRBs consistent with embodiments.

Embodiments contemplate a set of E-PDCCH REs in a PRB configured for enhanced downlink control channel (e.g. that may be used to define the muted RE and/or may be used for interference measurement). A set of E-PDCCH REs may be reserved for interference measurement, as shown, in the FIG. 19, for instance. A UE may measures interference in the muted RE in all E-PDCCH PRBs. The muted RE may be defined in all E-PDCCH PRBs in the same position if the CP length is the same in FDD mode. Mutually exclusive muted RE position may be used in multiple cells and/or multiple transmission points. For instance, in FIG. 10, REs are defined for muted RE for interference measurement. Among them, consecutive 2 REs in time domain are defined as a set of RE muting. Thus, the 4 sets of muted RE for interference measurement may be defined. One of RE muting sets may be configured for a cell or transmission point. The RE muting can be configured in cell-specific manner, and if the RE muting is not configured, then the UE may measure interference from other resources.

Embodiments contemplate reserved CCE in a legacy PDCCH region (e.g. that may be used to define the muted RE and/or may be used for interference measurement). For example, a set of logical CCE may be reserved for the interference measurement. An eNB may mute REGs of a set of logical CCE to cause a UE to measure the inter-cell interference. The set of logical CCE for interference measurement may be configured in a specific subframe, for instance.

In one or more embodiments, alternative definitions of IM-CSI-RS or IMR may be provided and/or used. For example, a UE may be configured with one or more IM CSI-RS or IMR resources. Each configuration may be based on a different method to estimate the interference on the IM-CSI-RS or IMR resource. The configuration may be provided by higher layer signalling. The signalling may be a combination of two elements, an IM-CSI-RS or IMR resource as well as an estimation method. Furthermore, the UE may be configured to provide feedback with different combinations (e.g., summations) of interference estimates, where each component interference estimate may be obtained by same or different estimation methods. The interference contribution from an IM resource may be estimated using at least one of the following.

For example, measuring the total or average energy from the IM resource may be used. In such a case, the desired transmission point(s) may provide the UE with either a muted RE or a zero-power (ZP) CSI-RS configuration.

Estimating or averaging the noise added to a non-zero-power (NZP) CSI-RS configuration transmitted in the IM resource may be used. In such a case, the desired transmission point(s) may provide the UE with a NZP CSI-RS while the interfering points may not apply muting on those resources. The UE may, for example, determine the variance of its estimation of the CSI-RS and consider that to be caused by the interfering points. This method may also be applicable to measuring interference on the CRS of the desired transmission point(s) (e.g., using an IM CRS).

Measuring the total or average energy from a known NZP CSI-RS transmitted from an interfering point(s) may be used. In one or more embodiments, the UE may estimate the received signal contribution from this NZP CSI-RS in the REs where it is transmitted, without including noise and interference from other sources in these REs. In such a case, points that may not be considered interference may apply muting (or ZP CSI-RS) on those resources. Equivalently, the UE may measure the total or average energy from the CRS transmitted from interfering point(s). For effective interference estimation, the UE may take into account the "Pc" ratio (PDSCH-to-CSI-RS ratio of energy per resource element) corresponding to the interfering point(s). Equivalently, for the case where the UE estimates interference on the interfering point's CRS, the UE may take into account the "Pa" and "Pb" ratio (e.g. a PDSCH-to-CRS ratio). The value of Pc that may be used by the UE for this purpose (e.g. an interference estimation) may be the same as the value provided for the purpose of estimating channel quality when the CSI-RS may be assumed to represent a desired signal. Alternatively, the value of Pc used for the purpose of interference estimation (e.g. Pc_int) may be different to model the fact that the received interference from a point transmitting a signal intended for another UE may be different (e.g. smaller) than if the signal may be intended for the same UE. The reason for this may be that the precoder used for transmission to another UE may result in non-coherent combining of the signals transmitted from multiple antenna elements for the UE estimating interference. The value of Pc_int may be directly provided by the network through higher layer signalling. Alternatively, it may be derived by adjusting Pc by a correction factor f (e.g. which multiplies in linear units or adds in dB units) that may be fixed or provided by the network through higher layer signalling.

In another example, the UE may take the average energy over more than 1 antenna port. The average may be obtained by a function (for example a weighted average) of the energy for each antenna port or a subset of antenna ports. Further, the UE may assume a certain precoder may be used over more than 1 antenna port. The precoder may be a fixed or configured precoder which, for example, may have no co-phasing. The precoder may correspond to the reported PMI for the corresponding NZP CSI-RS resource, if it may be part of the CoMP measurement set of the UE. The precoder at an instance may be a value obtained from a preconfigured cycling of precoder values.

According to an embodiment, measuring the total or average received power from a NZP CSI-RS or CRS of an interfering point may be used. One such realization of this method may be to reuse the RSRP measured on non-transmitting points. The RSRP may be the CSI-RS RSRP or the CRS-based RSRP or a combination of the two. For effective interference estimation, the UE may take into account the "Pc" or Pc_int ratio (PDSCH-to-CSI-RS ratio of energy per resource element) corresponding to the interfering point(s). Equivalently, for the case where the UE estimates interference on the interfering point's CRS, the UE may take into account the "Pa" and "Pb" ratio (e.g. PDSCH-to-CRS ratios). The UE may further take into account the reference signal power of the respective point and may take RSRP measurements over more than 1 antenna port. The average may be obtained by a function (for example a weighted average) of the RSRP for each antenna port or a subset of antenna ports. Additionally, a certain precoder may be used over more than 1 antenna port. The precoder may be a fixed or configured precoder which, for example, may have no co-phasing. The precoder may correspond to the reported PMI for the corresponding NZP CSI-RS resource, if it may be part of the CoMP measurement set of the UE. The precoder at an instance may further be a value obtained from a preconfigured cycling of precoder values.

CSI-RS Pattern Enhancement may be provided and/or used as described herein. As described above, low CSI-RS overhead may degrade interference measurement accuracy. The CSI-RS overhead may be increased while maintaining backward compatibility as follows. Multiple non-zero-power CSI-RS configurations may be used for increasing CSI-RS overhead. N-number of CSI-RS configurations may be configured for a UE, and the UE may consider all non-zero-power CSI-RS are transmitted from the same CSI-RS ports. For instance, the CSI-RS configurations 0 and 8 are configured for a UE, and the UE may assume the port-0 from CSI-RS configuration 0 and the port-0 from CSIRS configuration 1 may be the same CSI-RS port.

The N may be predefined with a positive integer number within, for example, 5>=N>=1. The N may be configured by higher layers together with the CSI-RS configuration. For 1, 2, 4 Tx CSI-RS configuration, CSI-RS configuration pair may be defined to minimize control signalling overhead and/or maintain equal frequency spacing for a CSI-RS port, as shown, for example in Table 6 of FIG. 20. Additionally, in an embodiment, 2× larger number of CSI-RS port may be configured with non-zero power transmission If an eNB may support 4 ports CSI-RS {15, 16, 17, 18}, the eNB may configure an 8 port CSI-RS pattern for a UE (e.g. for a Rel-11 UE). For such configuration, the number of CSI-RS ports may be supported up to 4Tx.

Additionally, the UE may consider the additional CSI-RS ports {19, 20, 21, 22} as the same CSI-RS ports {15, 16, 17, 18}, for instance. In such configuration, the RE position for CSI-RS ports {19, 20, 21, 22} may be configured as zero-power CSI-RS for legacy UEs to avoid the interference from CSI-RS ports. Further, to maintain equal frequency spacing for a specific CSI-RS port, the RE position of each of the CSI-RS ports for 8Tx may be as shown, for example, in FIG. 21. As shown, the CSI-RS ports {0, 4}, {1,5}, {2, 6} and {3, 7} may be considered as the same CSI-RS port from a Rel-11 UE.

CSI-RS patterns (e.g. for Rel-11) with equal frequency spacing for each CSI-RS port with 2RE/Port/PRB overhead are contemplated by embodiments. For example, two CSI-RS configurations of legacy CSI-RS pattern may be used to create a CSI-RS pattern with equal frequency spacing for each CSI-RS port with 2RE/Port/PRB overhead, and avoid legacy impact with RE muting (e.g., zero-power CSI-RS configuration). This CSI-RS pattern may be defined according to the number of CSI-RS ports, as shown, for example, in FIG. 22.

One or more occurrences of collisions between TM resources may be minimized. In an embodiment (e.g. for the purpose of describing the solutions herein such as below), "interference measurement resource element instance" (IM RE instance) may be used to refer to a specific resource element or set of resource elements in a specific subframe and resource block used for the purpose of interference measurement. Additionally, "IM subframe" may be used to refer to a subframe for which at least one TM RE instance exists. The UE performs interference measurements in a set of IM subframes.

In embodiments, "TM RE position" may be used to refer to the position of a specific TM RE in the resource block. A set of TM RE positions may be indicated by the value of at least one parameter such as a number of RE's and a configuration index. The mapping may be similar to or identical as the one used to map a CSI-RS configuration index to a set of RE positions (e.g. for CSI-RS resources in Release 10) for a given number of antenna ports.

UEs that may be estimating interference in neighbouring coordination areas may minimize the occurrences of collision between their respective IM RE instances to avoid under-estimation of their mutual interference. The following solutions may be used alone or in combination to reduce the complexity burden of achieving this. In an embodiment (e.g. in one solution), the positions of the TM REs may be varied between different TM subframes, possibly according to a pseudo-random sequence such as a Gold sequence, or according to another function such as a modulo function. In another embodiment (e.g. in another solution), the positions of the IM REs may also be varied between different physical resource blocks (PRB) or virtual resource blocks (VRB). In another embodiment (e.g. in another solution), the set of IM subframes may be separated (in time) according to a pseudo-random sequence or other function. For instance, the interval may be the sum of a fixed period and an offset function of the pseudo-random sequence or other function. It may also be possible to combine these solutions by using the same or different pseudo-random sequence(s) to vary the IM RE positions and IM subframe intervals or offsets.

A pseudo-random sequence may be generated based on an initial value $c_{init}$, where the use of different $c_{init}$ values generally results in different pseudo-random sequences. As such, a number (e.g. a large number) of distinct sets of IM RE instances may be generated, where systematic collisions between IM RE instances (e.g. use of same IM RE positions in same subframes and resource blocks) may be avoided even though sets of IM RE instances may be defined based on the same set of IM RE positions and IM subframe offsets. By assigning UEs in different coordination areas different sequences (e.g. identified with $c_{init}$), systematic collisions of IM RE instances may be avoided or prevented.

For example, the set of IM RE positions in a given IM RE instance may be identified by a configuration index r taking values between 0 and N−1. A set of IM RE instances may be determined by using the following formulas:

$$r = \sum_{i=0}^{N-1} c(Nm + i)2^i$$

where m may correspond to a quantity that may vary between IM RE instances of the same UE. For instance, m may be a function of the frame number $n_f$, slot number in the frame $n_s$, or subframe number, such as $m=10\ n_f+\lfloor n_s/2 \rfloor$. The value m may also be an index to a sequence of IM subframes used by the UE. For instance, m may be determined according to $m=\lfloor (10n_f+\lfloor n_s/2 \rfloor - \Delta_{IM})/T_{IM} \rfloor$ where $T_{IM}$ and $D_{IM}$ may correspond to the periodicity and offset of IM subframes, respectively. This may hold, for instance, if the set of IM subframes may be defined by the formula $(10n_f+\lfloor n_s/2 \rfloor - \Delta_{IM})$ mod $T_{IM}=0$.

The value m may also be a function of the PRB index nPRB to realize variations as a function of PRB. In this case, m may be determined for instance according to: $m=N_{RB}^{DL}\lfloor (10n_f+\lfloor n_s/2 \rfloor - \Delta_{IM})/T_{IM} \rfloor +$ nPRB or according to: $m=N_{RB}^{DL}(10n_f+\lfloor n_s/2 \rfloor)+$ nPRB where $N_{RB}^{DL}$ may be the total number of PRB's and nPRB is a PRB index.

The parameters $T_{IM}$ and $D_{IM}$ may be semi-static and provided by the network through higher layer signalling. This may result in periodic occurrences of IM subframes. Alternatively, variation of the IM subframe timing (or offset) may be realized by defining the value of $D_{IM}$ as the sum of a fixed offset $D_{IM,fix}$ and a variable offset $D_{IM,var}$, where the variable offset may take values 0 to P−1. In this case, the variable offset $D_{IM,var}$ may be determined according to:

$$\Delta_{IM,var} = \sum_{i=0}^{P-1} c(Pm + i)2^i$$

where m may correspond to one of the quantities described in the above, for instance an index to a sequence of IM subframes used by the UE:

$$m=\lfloor (10n_f+\lfloor n_s/2 \rfloor - \Delta_{IM,fix})/T_{IM} \rfloor$$

In the above, the pseudo-random sequence c( ) may be initialized with an initial value $c_{init}$. The value of $c_{init}$ may be determined by at least one of the following methods. The value of $c_{init}$ may be provided directly by the network through higher layer signalling. The value may correspond to, or be derived from a function of, the cell identity or another parameter provided by higher layers, such as a parameter representing a distinct IM resource configuration or a the sequence initiator for a non-zero-power CSI-RS resource.

In an embodiment, instead of using a Gold sequence as described in the above, it may also be possible to use a modulo function to create pseudo-random variations of IM RE positions between IM RE instances. If a set of IM RE positions may be indicated with a configuration index r as in the above, r may be defined as a function of at least subframe number i and/or PRB number nPRB such that the IM RE position may be randomized as r=f (i, nPRB). The subframe number i may itself be expressed as a function of frame number of and slot number $n_s$, such as $i=10n_f+\lfloor n_s/2 \rfloor$. It may be further randomized with an identity parameter such as the physical cell-ID or a UE-specific parameter UE-ID. In this case the IM RE position may be defined as a function of r=f (i, nPRB, nID), where nID may be cell-ID or UE-ID. Assuming that IM RE position is indexed from 0~N−1 in a PRB-pair, the following formula may be used to identify IM RE position:

$$r=(A \cdot i \cdot nID+nPRB) \bmod N,$$

where A denotes constant number and may be defined as A=39827.

Varying the set of IM RE positions or subframe offsets as described in the above may avoid systematic collisions between IM RE instances (e.g. but for UEs in coordinated areas that may be close or very close to each other (for instance, if the coordinated areas correspond to points in different sectors of the same site) where it may no collision at between a IM RE may be provided instance to maintain good performance). This may be realized by defining sub-groups of IM RE positions (and/or IM RE subframe offsets) where two different sub-groups may not include the same IM RE position(s) or the same IM RE subframe offset. For instance, in case the set of IM RE positions may be represented by a configuration index r that may take a value between 0 and 19, one sub-group may include the IM RE positions 0 to 4, a second sub-group may include the IM RE positions 5 to 9, and the like. This scheme may allow or enable the network to assign different sub-groups to UEs in adjacent coordinated areas and avoid collisions between the IM RE instances of these UEs.

A sub-group may be represented by a sub-group index g. The sub-group index g may be determined by at least one of the following techniques. The sub-group index g may be provided directly by the network through higher layer signalling. The sub-group index g may correspond to, or be derived from a function of, the cell identity ($N^{cell}_{ID}$) or another parameter provided by higher layers, such as a parameter representing a distinct IM resource configuration or a the sequence initiator for a non-zero-power CSI-RS resource. For example, the sub-group index may correspond to the parameter $v_{shift}=N^{cell}_{ID}$ mod6. This configuration scheme may be beneficial as the network planning may be normally such that closely coupled cells may be already configured to have different $v_{shift}$ parameters.

When using one of the above embodiments, it may be possible that an IM RE instance may coincide with a RE instance used for another purpose, such as a RE instance where another reference signal may be transmitted for the purpose of estimating the desired signal for CSI reporting (e.g. a non-zero-power CSI-RS). It may also be possible that the RE instance may be used by the network to transmit a non-zero-power signal from a transmission point that may normally not be included in the interference estimate for the UE.

In one or more embodiments, the UE may exclude from the interference estimate the IM RE instances that may coincide with RE instances where another reference signal may be transmitted. The UE may estimate interference by averaging over remaining non-excluded IM RE instances, if available, in the same subframe and possibly previous subframes. The UE may also reuse the interference estimate from the latest IM subframe if all IM RE instance in an IM subframe are excluded.

Alternatively or additionally, in one or more embodiments, the UE may perform interference estimation on the IM RE instances that may coincide with RE instances where another reference signal may be transmitted, but may use another interference estimation method in these IM RE instances. For example, the UE may estimate interference by estimating the noise added to the other reference signal in these particular IM RE instances, instead of measuring the total energy from the RE.

The UE may determine that the IM RE instances that may be subject to special handling according to one of the above methods include one or more of the following RE instances: RE instances included in a non-zero-power CSI-RS resource configured for CSI reporting (in the CoMP measurement set); RE instances included in a non-zero-power CSI-RS resource configured for CoMP resource management (CRM) set; RE instances indicated by the network from physical or higher layer signalling (e.g. these RE instances may be identified by the configuration of a non-zero-power CSI-RS resource); and the like.

In an embodiment, a UE may estimate interference from neighbour cell CSI-RS if the UE can receive the CSI-RS without PDSCH interference. In one or more embodiments, interference measurement may provide flexible interference measurement for the distributed antenna based network deployment. For instance, although a UE sees multiple transmission points in a network, a subset of the transmission points may involve the data transmission for the UE while the remaining transmission points may serve other UEs. In this case, the interfering transmission point may be changed from one subframe to another. As such, a UE may measure the interference level once a set of transmission points may be decided.

Additionally, in an embodiment, a UE may estimate multiple types of interference for different purposes, and using multiple solutions or combination of solutions as described herein. In some of the following examples of types of interference, the notion of a coordinated multi-point transmission set (CoMP set) of the UE may be used. Transmission points within a CoMP set of the UE may correspond to points from which the UE may receive a desired signal, and/or points whose transmission may be controlled to minimize interference to the UE. The CoMP set may include points that may be part of the same cell, (e.g., transmit the same cell-specific reference signal) and/or different cells.

A type of interference may be characterized by at least one of: 1) whether the undesired signals may provide from points within the CoMP set or from outside the CoMP set of the UE; and/or 2) whether the undesired signals may provide from points that are part or not part of the serving cell of the UE.

In the following definitions, at least when the interference may be used for the purpose of CSI reporting, the point(s) from which the desired signal may be assumed to be transmitted from may be excluded from the set of transmission points assumed to be contributing to the interference.

For example, the multiple types of interference may include at least one of the following types. One type may be a Type-0 interference that may include undesired signals from transmission points which may not be part of a CoMP set of the UE and may be referred to as "out-of-CoMP-set" interference. Another type may be Type-0A interference that may include undesired signals from transmission points and may be referred to as "total" interference. Another type may be Type-1 interference that may include undesired signals from transmission points that may be part of the serving cell of the UE, but may not be part of the CoMP set of the UE, and may be referred to as "intra-cell, out-of-CoMP-set" interference, for example. Another type may be Type-1A interference that may include undesired signals from transmission points that may be part of the serving cell of the UE, (e.g., transmit cell-specific reference signals that may be the same as the serving cell of the UE), and may be referred to as "intra-cell interference". Another type may be Type-2 interference that may include undesired signals from transmission points that may not be part of the serving cell of the UE and may not be part of the CoMP set of the UE, and may be referred to as "inter-cell, out-of-CoMP set" interference.

Another type may be Type-2A interference that may include undesired signals from transmission points that may not be part of the serving cell of the UE, (e.g., transmit cell-specific reference signals that may be different than the serving cell of the UE), and may be referred to as "intercell interference". This may correspond to Type-2 interference in case points of the CoMP set may be part of the serving cell of the UE. Yet another type may be Type 2B interference that may include undesired signals from cells and/or transmission points that may not be part of the coordinating cluster of cells from which a UE may be configured a CoMP set. This may be referred to as "inter-cluster interference." Further, this type of interference may correspond to Type-2 interference when the coordinating cluster corresponds to transmission points of a serving cell of the UE. Another type may be Type-3 interference that may include the interference from a single transmission point (or in another method, from a single CSI-RS resource). The point may be in the UE's CoMP measurement set, or the UE's extended CoMP measurement set, or in the coordinating set, or any combinations of these sets, or none of these sets.

For the types of interference that may exclude transmissions from within the CoMP set of the UE (e.g. type-0, type-1, type-2), the interference estimate may be the same regardless of which point of the CoMP set may be the point from which the desired signal may be assumed to be transmitted. On the other hand, for the types of interference that may not exclude transmissions from within the CoMP set of the UE, the interference estimate may depend on the specific point of the CoMP set for which CSI is estimated.

Additionally, the selection of the type of interference may depend on CSI reporting types, (e.g., periodic CSI reporting or aperiodic CSI reporting), and/or CSI reporting modes, (e.g., wideband and subband).

Each of the above types of interference may be estimated using at least one interference measurement technique. For example, type-2A interference, (and type-2, in case points of the CoMP set may be part of the serving cell), may be estimated by measuring on cell-specific reference signal (CRS). Types of interference may be measurable using any of the IM solutions provided above, where the UE may be using different sets of IMCSI-RS as well as different interference measurement techniques for different types of interference (possibly depending on which point the desired signal is transmitted from).

For example, a UE may estimate type-1 interference from IM-CSI-RS and type-2 interference from CRS. For type-1 interference measurement, a UE may estimate type-1 interference in a subset of subframes where IM-CSI-RS may be available. On the other hand, a UE may keep measuring and averaging type-2 interference in the subframes including CRS.

In another example, a UE may estimate type-1 interference from IM-CSI-RS and type-2 interference from non-zero-power CSI-RS. For type-1 interference measurement, a UE may estimate type-1 interference in a subset of subframes where IM-CSI-RS may be available. Also, a UE may estimate type-2 interference in a subset of subframes having non-zero-power CSI-RS.

In another example, a UE may estimate type-1 interference from non-zero-power CSI-RS and type-2 interference from CRS. For type-1 interference measurement, a UE may estimate type-1 interference only in a subset of subframes where non-zero-power CSIRS may be available. For type-2 interference, a UE may measure interference in the subframes including CRS.

In another example, a UE may estimate type-2 interference from zero power (ZP) CSI-RS and type-3 interference from non-zero power (NZP) CSI-RS of interfering point(s). For a type-2 interference measurement, a UE may estimate type-2 interference in a subset of subframes where ZP CSI-RS may be available. For each type-3 interference, the UE may measure interference in the subframes including NZP CSI-RS.

In another example, a UE may estimate type-2 interference from the NZP CSI-RS of the desire transmission point(s) and type-3 interference from NZP CSI-RS of interfering point(s). For a type-2 interference measurement, the UE may estimate type-2 interference in a subset of subframes where NZP CSI-RS of the transmitting point(s) is available. For each type-3 interference, the UE may measure interference in the subframes including NZP CSI-RS.

In another example, a UE may estimate type-1 interference from NZP CSI-RS of the desired transmission point(s) and type-3 interference from NZP CSI-RS of interfering point(s). For a type-1 interference measurement, the UE may estimate type-1 interference in a subset of subframes where the NZP of the desired transmission point(s) may be available. For each type-3 interference, the UE may measure interference in the subframe including NZP CSI-RS.

In another example, the subframes including CRS may be either a subframe having CRS in both PDCCH and PDSCH regions or a subframe having CRS at least in PDCCH region.

Figure 21:
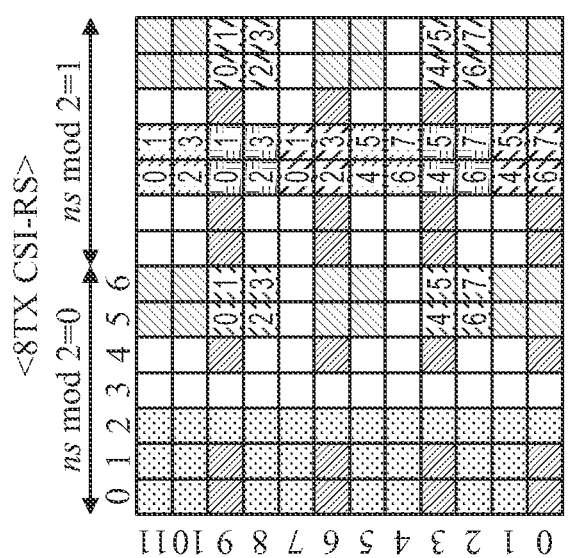
FIG. 21 shows an example 8Tx CSI-RS pattern operable with a Release 11 UE/WTRU for interference measurement consistent with embodiments.
Figure 22:
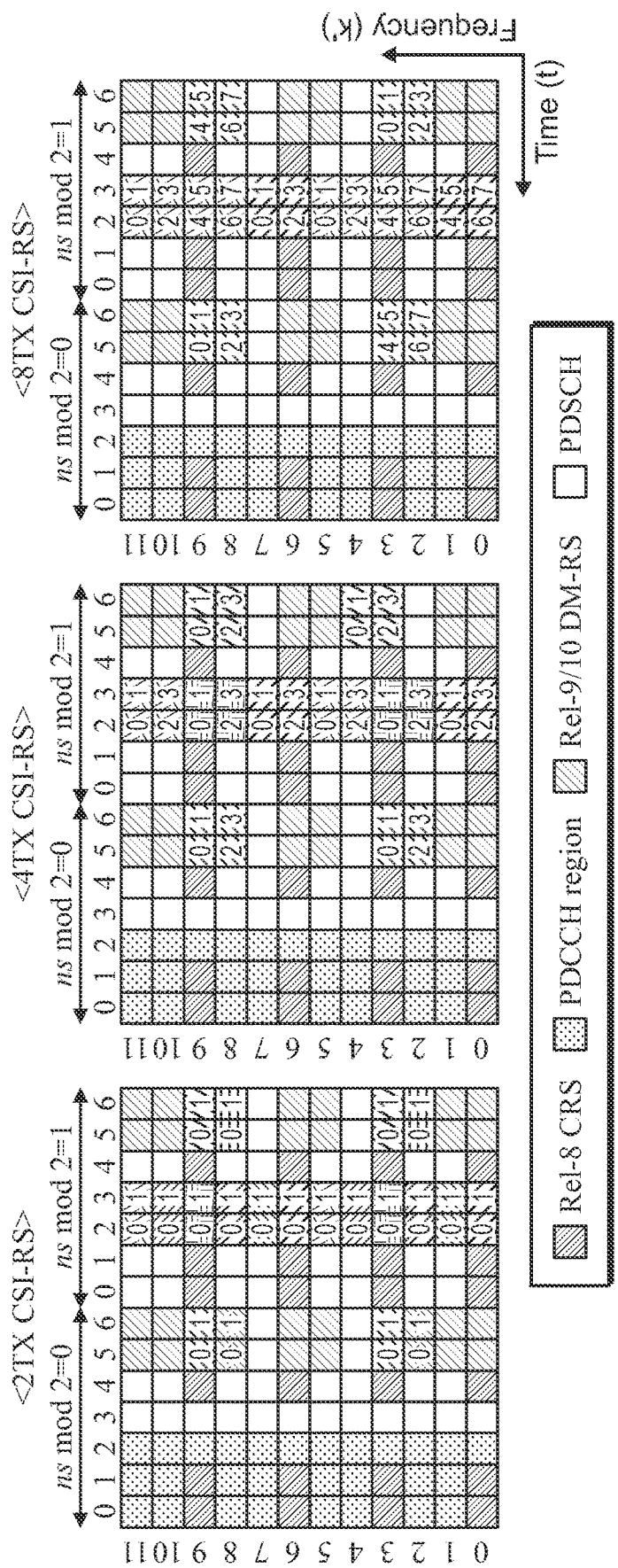
FIG. 22 shows an example CSI-RS pattern according to the number of CSI-RS Ports operable in Release 11 consistent with embodiments.

In another example, the non-zero-power CSI-RS patterns may be CSI-RS patterns (e.g. Rel-10 CSI-RS patterns) shown in the FIG. 11 or enhanced CSI-RS patterns shown in FIGS. 21 and 22.

A UE may estimate type-1 interference from the RSRP (either CRS-based RSRP or CSI-RS-based RSRP) of the interfering points within the CoMP resource management (CRM) set and outside of the CoMP measurement set. To achieve this, the UE may be configured with a mapping of points within the CRM set and the CoMP measurement set in the case where points may be located in both sets at the same time. Such a configuration may be used since it is possible that one point may have a different configuration of CSI-RS in the CRM set as that configured in the CoMP measurement set.

Additionally, a UE may estimate type-1 interference from the RSRP (e.g. either CRS-based RSRP or CSI-RS-based RSRP) of a subset of interfering points within the CRM set.

The estimated interferences of different types may be used for at least one of following: 1) CSI feedback (e.g., CQI, PMI, and/or RI), calculations; 2) RSRQ measurement; 3) PDSCH demodulation such as MMSE-IRC receiver; and the like.

CSI reporting may be provided and/or used. For example, in certain deployments scenarios such as those with geographically separated antennas, a UE at a given location may potentially receive a desired signal from more than point and undesired signals from more than one point, where the points in each case may or may not belong to the serving cell of the UE. Correspondingly, the UE may be configured to report CSI under different assumptions (or transmission hypothesis), as to the point or set of points that may be transmitting to the UE and the point or set of points that may create interference for the UE. As such, the UE may estimate (and in some embodiments may have to estimate) more than one interference estimate for use in the multiple types of CSI that may be transmitted. Embodiments contemplate that a "type of CSI", corresponding to a specific transmission hypothesis, may also be referred to as a "CSI process" or "CSI case."

In one or more embodiments, the UE may be explicitly provided with a list of at least one interference measurement resource (IM-CSI-RS or IMR) for each type of CSI (or CSI process) that the UE may have to report. Each type of CSI (or CSI process) may then be defined with at least one non-zero-power CSI-RS configuration (or CSI-RS-resource), or a CRS resource, corresponding to at least one point assumed to be transmitting a desired signal for this type of CSI, and at least one IM-CSI-RS used for estimating the interference. The solution(s) of interference estimation that the UE may use, and whether the IM-CSI-RS (or IMR) may be a zero-power resource or a nonzero-power resource may also be indicated as part of the configuration, possibly for each IM-CSI-RS (or IMR).

For example, the UE may be configured to report the following sets of CSI (using arbitrary indices of configurations): 1) CSI type (or CSI process) A, having non-zero-power CSI-RS configuration #1 and IM-CSI-RS #27; 2) CSI type (or CSI process) B, having non-zero-power CSI-RS configuration #1 and IM-CSI-RS #23; and 3) CSI type (or CSI process) C, having non-zero-power CSI-RS configurations #1 and #2 and IM-CSI-RS #23.

In the above example, CSI type A and type B may correspond to single-point transmission from point #1, with different interference estimates. For example, possibly during RE's corresponding to IM-CSI-RS #23, point #2 may not be transmitting either, such that CSI type B corresponds to a single-point transmission with muting assumption from point #2. CSI type C may correspond to a joint transmission from points #1 and #2. In the above, the definition of a non-zero-power CSI-RS (or CRS) configuration may be general. It may include, for example, a subframe configuration, a resource configuration, a number of antenna ports, a parameter indicating the ratio between PDSCH and CSI-RS RE power, and the like. In one or more embodiments, it may also include one or more additional parameters, perhaps in case IMR collision avoidance techniques are used, such as parameters used for the generation of pseudo-random sequences determining variations in the positions of IM REs and/or subframes.

In one or more embodiments, the UE may be provided at least one of the following sets of IM-CSI-RS as part of its CSI reporting configuration: 1) a set of IM-CSI-RS suitable for reporting CSI under the assumption of no interference from within the CoMP set (e.g., type 0); 2) for each non-zero-power CSI-RS resource (or CRS-resource) for which per-CSIRS-resource may be reported, a set of IM-CSI-RS suitable for reporting CSI under the assumption that interference may be generated from other points within the CoMP set (e.g. type OA); and the like.

Such arrangement may also provide substantial flexibility for reporting different types of CSI. For example, CSI for a joint transmission (and/or single-point transmission with muting from other points of the CoMP set) may be estimated using the common set of IMCSI-RS, while CSI for single-point or single-CSI-RS-resource transmissions without muting assumption may be estimated using the set of IM-CSI-RS associated to the corresponding non-zero-power CSI-RS-resource.

In one or more embodiments, the UE may know, for each non-zero-power CSI-RS resource or CRS, at least one IM-CSI-RS resource that correspond to RE's during which the corresponding transmission point(s) may not transmit PDSCH. If so configured, the UE may then report the CSI for a joint transmission from a given subset of the corresponding points (or a single-point transmission with muting from other points) using the intersection of the corresponding subsets of IM-CSI-RS resources for the purpose of interference estimation. For example, the UE may be provided the following configuration for CSI reporting: 1) nonzero-power CSI-RS configuration #1 with IM-CSI-RS #3, #10, #13, #15, #17, #20; and/or 2) non-zero-power CSI-RS configuration #2 with IM-CSI-RS #3, #10, #13, #14, #16, #19.

The UE may estimate the interference for a joint transmission from points corresponding to CSI-RS-resources #1 and #2 and may measure on the intersection of the sets, e.g., #3, #10 and #13. In case the UE may have to report a per-CSI-RS-resource, (or per-point), CSI assuming that other points of the set may be generating interference, the UE may measure on the subset of IM-CSI-RS that may be part of the configuration for the concerned non-zero-power CSI-RS-resource but may not be part of the configuration of other resource(s). For example, in case the UE reports a per-CSI-RS-resource CSI for #1 without muting from #2, it may measure on IM-CSI-RS #15, #17 and #20 in the above example.

In another example, the UE may be configured with a list of NZP CSI-RS as well as a list of IM-CSI-RS resources. The configuration message may indicate to the UE the possible transmission states which may be assumed for each NZP CSI-RS resource. For example, NZP CSI-RS resources A and B may be tied to points that may be considered as either transmitting or blanking or interfering, while NZP CSI-RS resource C may be tied to a point which may either be blanking or interfering. In such scenarios, a CSI feedback (or CSI process) may be tied to a combination of allowed assumptions on each configured NZP CSI-RS as well as to the IM CSI-RS resource(s) configured. Furthermore each IM CSI-RS resource may be configured differently such that the UE may obtain interference on each in a potentially different manner. In such a solution, the UE may be configured with a CQI "Type" (or CSI case or CSI process) that may be defined as a combination of: a set of NZP CSI-RS resources, where each resource may also be configured with a set of possible transmission assumptions (for example: transmitting, interfering, or blanking); a set of IM-CSI-RS resources, each defined with a method to obtain the interference estimate; and alternatively or additionally, a method (or function) to obtain the over-all interference from some or each interfering component. Alternatively or additionally, embodiments contemplate providing a set of IM-CSI-RS resources (or IMR) for some or each method of obtaining the corresponding interference component. For instance, one IMR could be utilized to estimate an interference contribution using the method of measuring the total or average energy over the IMR, while another IMR could be utilized to estimate an interference contribution using the method of total or average energy from a NZP CSI-RS. In such scenarios, the CoMP measurement set may include points or NZP CSI-RS resources that may be assumed to be either a desired signal or interference depending on the CSI process. For example, a CoMP measurement set may include two points which may aid in transmission, as well as another point which may be considered as either blanking or interfering, and whose CSI-RS may be used to aid in the interference estimation.

For a single CQI "type" (or transmission assumption/hypothesis or CSI case or CSI process), the UE may estimate the interference by summing contributions over more than one IM resource and/or over NZP resources that may be assumed to be interfering according to the transmission hypothesis. Furthermore, the interference estimate for each contribution may obtained by one or more methods defined previously. For a report instance, the UE may be configured with a specific instance of transmission state (from the configured set of possible transmission states defined for each point or CSI-RS resource). Furthermore, the UE may be configured with a specific method to obtain an interference estimate on each component of the interference.

The following example illustrates a possible application of this method. In this example, the UE is configured with 3 NZP CSI-RS resources, labelled NZP #1, NZP #2 and NZP #3. The UE may also be configured with one IM CSI-RS resource, labelled IM #1. The UE may be further configured to report CSI for the following transmission hypotheses (TH), corresponding to a CSI process: TH #1, TH #2, TH #3, and TH #4. In TH #1, NZP #1 may be transmitting desired signal, NZP #2 may be muting, and NZP #3 may be interfering. In TH #2, NZP #1 may be muting, NZP #2 may be transmitting desired signal, and NZP #3 may be interfering. In TH #3, NZP #1 may be transmitting desired signal, NZP #2 may be muting, and NZP #3 may be muting. In TH #4, NZP #1 may be muting, NZP #2 may be transmitting desired signal, and NZP #3 may be muting. Some or each of the CSI process may also be configured to use IM #1 as interference resource (IMR). To calculate the interference for each of the above hypothesis, the UE may first estimate the interference from the interference resource IM #1 possibly according to a configured method (for instance, the IM may be a ZP CSI-RS resource in which case the UE estimates interference by measuring the average energy over the resource). The UE may also add interference from any NZP CSI-RS resource that may be interfering according to the transmission hypothesis. In the above example, the UE may add interference measured from NZP #3 (as interfering signal) to the interference measured from IM #1, for transmission hypotheses TH #1 and TH #2.

Alternatively or additionally, in one or more embodiments, the UE may include in its interference estimate the contribution of a certain IMR only if IM REs from this IMR are present in the subframe used as CSI reference resource. In other words, the contribution of a certain IMR may be included only if the subframe used as CSI reference resource is an IM subframe for this IMR. The CSI reference resource may correspond to the subframe in which the aperiodic CSI is triggered, for example.

Alternatively or additionally, a UE may also be configured with an offset or a set of offsets. This set of offsets may be configured by the network either via higher layer signalling or a new information element in a DCI (such as the DCI used to trigger aperiodic feedback). The offsets may have at least one of the following meanings: a linear or logarithmic value to be added to the total interference measured by the UE where such an offset may be cumulative over the past several values indicated by the network; a scaling value to be used on the interference measured by the summation of all the configured interference measurement values for a specific CSI case; a scaling value to be used on a subset of the interference measured by UE; and the like. For example, a UE may be configured to estimate the interference by using two component IMRs possibly by two different IM methods. In this case, the UE may be configured to use the offset value to scale one of the two interference values measured by one of the IMRs. The UE may then add the scaled value to the non-scaled value to obtain the final interference estimate. Alternatively or additionally, multiple offsets may be used, each configured to scale a specific component of the interference measurement.

The usefulness of using an offset may be to correct under-estimation of interference caused by the estimation of interference over an IM resource that may not capture the interference. The value of the offset may be a function of the absolute value of the estimated interference. This may allow the UE to apply a smaller adjustment to the measured interference estimate when there may be a large proportion of thermal noise in the interference estimate. The value of the offset may also be a function of the absolute value of the desired signal, or the value of the signal-to-interference ratio or CQI for a given CSI case, to account for the possibility that the needed correction may not be as high for low CQI as for high CQI values. The value of the offset to apply as a function of the absolute estimated interference, absolute value of the desired signal, signal-to-interference ratio or CQI may be provided by higher layers (e.g. with a value for each range of the quantity).

The value of the offset may also be a function of the RSRP or CSI-RS based RSRP measured from certain CRS or non-zero-power CSI-RS resources part of the CRM or the CoMP measurement set. The list of reference signals (CRS and/or CSI-RS) from which to include the corresponding RSRP or CSI-RS based RSRP for this purpose may be provided by the network through higher layer signalling.

Alternatively or additionally, a UE may also be configured with a list of points within a CoMP resource management (CRM) set, or alternatively within the CoMP measurement set, for which it may use the RSRP as an interference measurement. This configuration may correspond to the points, or a subset of points. The subset of points may be explicitly indicated. Alternatively, the UE may be configured to use a subset of size x that corresponds to the x points in the CRM set (or CoMP measurement set) whose RSRP may be greatest.

Alternatively or additionally, a UE may be configured to use the RSRP of a point in the CRM set, or alternatively a point in the CoMP measurement set, for which it may not have been configured to measure interference via other means or to use as a desired signal. For example, a UE may have points A, B, C and D in its CRM set. At least one CSI case or CSI process may correspond to using the NZP CSI-RS of point A as desired signal and to use the NZP CSI-RS of point B as interference point as well as another IMR to estimate out of CRM set interference. In such a scenario, the UE may also be configured to use the RSRP of the remaining points (in this example points C and D) to add to the total interference estimate.

In one or more of the above techniques, the set of IM-CSI-RS resources that are configured for each CSI-RS-resource and/or CQI type may depend on at least one of: 1) whether CSI is for periodic or aperiodic CSI reporting; 2) the periodic or aperiodic CSI mode; 3) an indication in the DCI containing the aperiodic CSI request, (or the aperiodic CSI request field itself); and the like.

In addition, for periodic CSI reporting it may be possible that CSI estimated using different interference resources are reported in different periodic instances, even if the CSI may be for the same non-zero-power CSI-RS resource (or CRS resource).

Embodiments contemplate PDSCH decoding. For example, in one or more of the above techniques, the UE may use the knowledge of the IM-CSI-RS resource (or IMR) corresponding to each type of CSI or each non-zero-power CSI-RS-resource, (or CRS-resource), to use the appropriate PDSCH rate matching for a single-point or joint transmission, according to one or more of the following techniques.

One or more embodiments contemplate that the UE may decode PDSCH assuming that the REs used for transmitting a IM-CSI-RS of the configuration, (as well as any non-zero-power CSI-RS), may not be used for PDSCH transmission.

Alternatively or additionally, embodiments contemplate that the UE may decode PDSCH assuming that the REs used for transmitting the IM-CSI-RS that may be present in CSI configurations, (in the third solution of IM-CSI-RS configuration), or that may be used for the measurement of interference from outside the CoMP set, (in the second solution of IM-CSI-RS configuration), may not be used for PDSCH transmission, while REs used for transmitting other IM-CSI-RS may be actually used for PDSCH. This solution may allow the network to transmit useful PDSCH data from a subset of transmission points in these RE's. In case dynamic scheduling provides information as to which transmission point(s) may be involved in the actual transmission, the UE may assume that an RE includes PDSCH if at least one transmission point involved in the actual transmission may not use this RE for IM-CSI-RS or non-zero-power CSI-RS or CRS transmission.

Alternatively or additionally, embodiments contemplate that the UE may be explicitly indicated in a set of REs that may be assumed to not be used for PDSCH transmission. Such indication may be at physical layer, (e.g. in the DCI assignment), in a MAC control element or from the RRC configuration.

Embodiments contemplate one or more configurations for scenarios with geographically separated antennas. Terminologies used in connection with a distributed antenna based network deployment may be provided herein as follows. A measurement set may be a set of transmission points (TPs) a UE can estimate channel status such that a UE may see a CSI-RS from a transmission point within measurement set. In one or more embodiments, a TP may correspond to a specific NZP CSI-RS resource. A reporting set may be a set of transmission points (TPs) a UE may report CSI to. Multiple reporting sets may be configured to a UE and the transmission points in reporting sets may be configured within measurement set. A collaborating set may be a set of transmission points (TPs) transmit signals to a UE in a subframe. The collaborating set may be changed from a subframe to another. Additionally, a transmission point in collaborating set may be in the measurement set.

Figure 23:
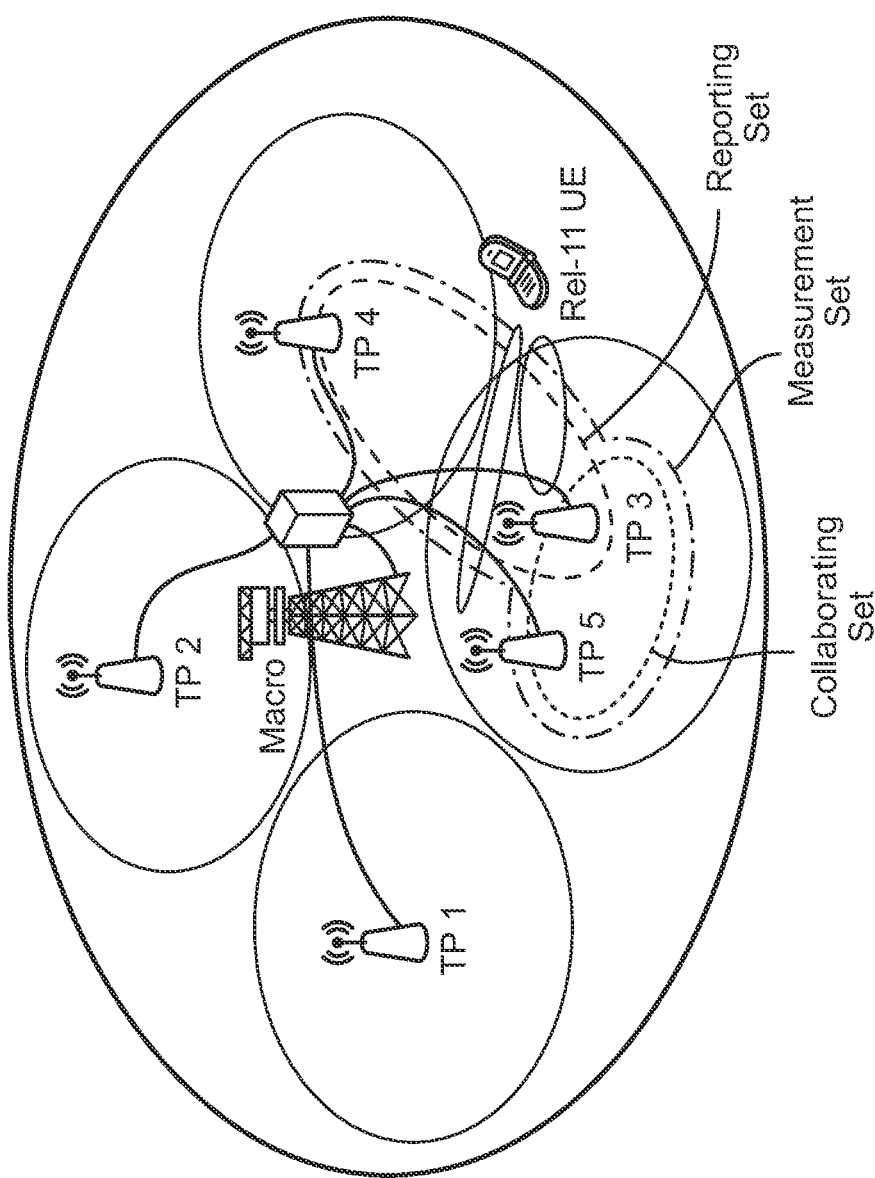
FIG. 23 shows an example of measurement set, reporting set, and collaborating set in a distributed antenna based network deployment consistent with embodiments.

FIG. 23 shows an example of a measurement set, reporting set, and collaborating set in the distributed antenna based network deployment. With reference to FIG. 23, the set of TP {3, 4, 5} may defined as measurement set, and a subset TP {3, 4} may be considered as reporting set. Although a UE reports CSI for TP {3, 4}, the actual transmission points transmitting a signal to the UE may be different as TP {3, 5}. The collaborating set may be the same as reporting set for better support link adaptation. In an embodiment, it may assumed that collaborating set may be the same as reporting set.

To facilitate accurate interference measurement in the distributed antenna based network deployment, the system may support or include the following. An interfering TPs set definition may be provided and/or used. For example, an eNB may inform interfering TPs set for a UE to take the inference into account in its CSI reporting. The interfering TPs set may be defined within the extended CoMP measurement set, thus, a TP in interfering TP set may be within the extended CoMP measurement set. The interfering TPs set may be defined as the remaining TPs that may not be configured for reporting set within measurement set. The interfering TPs set may be smaller than the remaining TPs that may not be configured for reporting set within measurement set. This may be because a TP not involving collaborating set may be turned off to minimize interference. Multiple interfering TP sets may be defined if multiple reporting sets may be used. Since the actual collaborating set of a UE may vary dynamically from subframe to subframe, the UE may measure interference under several different hypothesis of interference TPs even if a single reporting set may be defined. The interfering TPs set may be composed of different types of elements.

The elements of an interfering TPs set may represent a single port, multiple ports from a single interfering point or multiple ports from multiple interfering points. As an example, an interfering TPs set may be composed of two elements, comprising a transmission point and another element representing the interference from out-of-CoMP-cluster interference (the combination of all ports from all points outside of the CoMP cluster). A UE may measure interference on each element in an interfering TPs set in an element-specific manner. For example, a UE may measure interference at the non-zero-power CSI-RSs from interfering TP sets, using for instance the one or more embodiments described herein of measuring the energy from the NZP CSI-RS. Alternatively or additionally, the UE may measure a desired signal at the NZP CSI-RS of the transmitting points and may use the noise in its desired signal estimate as the interference estimate. In another solution, the UE may measure interference at ZP CSI-RS configured by the transmitting point(s).

A PDSCH-to-CSI-RS power ratio (Pc) may be provided and/or used as described herein. In an example, the PDSCH-to-CSI-RS power ratio (Pc) may be configured for the UEs via higher layer signalling using one or more of the following. For example, the power ratio may be different according to the TPs, thus, using the Pc for TPs within a measurement set. A UE may take Pc's into account for its channel and interference measurement (TP specific Pc). Alternatively, a UE may assume that Pc is the same across TPs within measurement set (Measurement set specific Pc). As another alternative, a UE may assume that Pc may be the same across TPs within reporting set (Reporting set specific Pc). In yet another alternative, a different Pc may be defined for PUSCH and for PUCCH reporting (Reporting mode specific Pc).

As another alternative, a different Pc may be defined according to the subframe type (e.g., normal subframe, ABS subframe, and MBSFN subframe) (Subframe type specific Pc). As another alternative, a different Pc may be defined for extended CoMP measurement set reports (such as for example, RSRP, RSRQ, CSI-RSRP, CSI-RSRQ).

Interference Measurement with Partial Interference Information may further be provided and/or used as described herein. For example, in LTE, interference measurements for CSI feedback at the UE may be commonly performed using Cell-specific Reference Signals (CRS) Resource Elements (REs). However, in advanced deployment scenarios such as CoMP and heterogeneous networks (HetNet), interference measurements using the CRS REs of the serving cell alone may not be satisfactory due to the substantial interference level from neighbouring cell(s) CRS transmissions. Accordingly, the UE may perform interference measurement by taking into account the information of CRS transmissions of neighbour cell(s). This approach may improve the interference estimation capabilities of the UE. Based on this solution, the UE uses at least part of the following information regarding the neighbour cell(s) to improve its interference measurements: 1) the number of CRS ports of neighbour cell(s); 2) the frequency shift associated with the CRS of neighbour cell(s)—$v_{shift}$; 3) the subframe/slot numbers of neighbour cell(s) on which the CRS is transmitted—$n_s$; 4) the configuration of MBSFN subframes of neighbour cell(s); 5) The bandwidth of neighbour cell(s); 6) the cell identity of neighbour cell(s)—$N_{ID}^{cell}$; 7) the type of cyclic prefix (CP) used $$N_{CP} = \begin{cases} 1 & \text{for normal } CP \\ 0 & \text{for extended } CP \end{cases} ; \qquad 8)$$

the power boosting applied on the CRS of neighbour cell(s); and the like

The UE may obtain this information through higher layer signalling or alternatively, the UE may obtain partial information of neighbour cell(s) from higher layer signalling and acquire the remaining information through a neighbour cell search process and may apply them for interference measurement.

The UE may also autonomously use the CRS information of a subset of neighbour cells for interference measurements. This subset of neighbour cells could potentially encompass the strongest interferers from the UE's point of view.

Additionally or alternatively, the UE may use a combination of CSI-RS resources, zero-power CSI-RS resources, CRS resources of the serving cell and CRS resources of neighbour cells for interference measurement.

Figure 24:
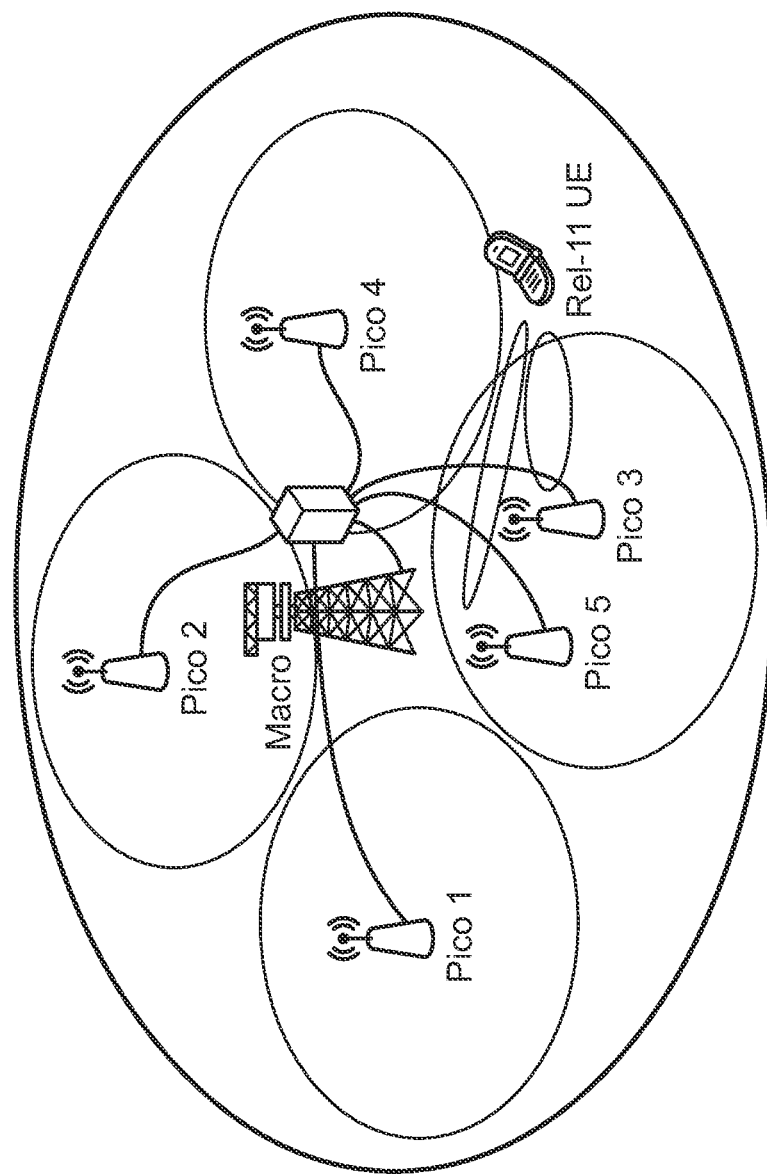
FIG. 24 shows an example heterogeneous network consistent with embodiments.

Embodiments contemplate Time Domain Multiple Interference Measurement and/or subframe subsets. In some network scenarios such as a heterogeneous network shown in the FIG. 24, the type-1 interference and type-2 interference level may be changed from a subframe to another according to the network configuration and cell loading situation.

Since Macro cell may transmit higher power than Pico cells, a UE connected to Pico cell may not receive signals due to the strong interference from Macro cell. To handle this circumstance, a subset of subframes in Macro cell can be configured as almost blank subframe (ABS) so that UEs in Pico cells may receive signals without strong interference. On the other hand, a UE may experience difference interference level according to the subframe configuration in Macro cell such that interference estimation for CSI feedback may be performed differently.

A UE may be informed regarding the subframe configuration with multiple CSI subframe sets. For example, subframe sets $C_{CSI,0}$ and $C_{CSI,1}$ may be configured by higher layers, each CSI reference resource belongs to either $C_{CSI,0}$ or $C_{CSI,1}$ but not to both. The interference measurement may also follow the subframe set configuration. In this case, UE behaviour for interference measurement may be at least one of following as described herein.

For example, a UE may estimate interference from the CSI reference resource $C_{CSI,0}$ or the CSI reference resource $C_{CSI,1}$. For example, a UE may be configured with a CSI reference resource and the UE may estimate interference only in the configured subframe set. In another example, within the subframe set, a UE may average the estimated interference during a subframe window size, where the subframe window size may be predefined or configured by higher layer. For instance, the window size may be one of $\{1, 5, 10, 20, 40, \text{and } 80\}$.

In another example, within the subframe set, a UE may estimate the interference in a valid downlink subframe when the UE may be requested to report periodic CSI or may want or need to report periodic CSI, where the valid downlink subframe can be differentiated if a downlink subframe meets following criteria: 1) it may be configured as a downlink subframe for that UE; 2) it may not be an MB SFN subframe for PMCH transmission; 3) it may not include a DwPTS field in case the length of DwPTS may be equal to or less than 7680·Ts.; 4) it does not fall within a configured measurement gap for that UE; 5) it includes the corresponding reference resource such as IM-CSI-RS, CSI-RS, and/or CRS according to interference measurement type.

Irrespective of the CSI feedback timing, a UE may use the estimated interference for a single CSI reference resource either $C_{CSI,0}$ or $C_{CSI,1}$. For example, in an embodiment, a UE may estimate interference from both CSI reference resource $C_{CSI,0}$ and $C_{CSI,1}$. In one example, a UE may estimate interferences $I_{CSI,0}$ or $I_{CSI,1}$ separately from the subframe sets. The $I_{CSI,0}$ may be estimated within the reference resource $C_{CSI,0}$ and the $I_{CSI,1}$ may be estimated within the reference resource $C_{CSI,1}$. In another example, within the subframe set, a UE may average the estimated interference during a subframe window size and the subframe window size may be predefined or configured by higher layer. For instance, the window size may be one of $\{1, 5, 10, 20, 40, 80\}$.

In another example, within the subframe set, a UE may estimate the interference in a valid downlink subframe when the UE is requested to report aperiodic CSI or may want or need to report periodic CSI, where the valid downlink subframe may be differentiated if a downlink subframe meets following criteria: 1) it may be configured as a downlink subframe for that UE; 2) it may not be an MBSFN subframe for PMCH transmission; 3) it may not include a DwPTS field in case the length of DwPTS is equal to or less than 7680·Ts.; 4) it may not fall within a configured measurement gap for that UE; 5) it includes corresponding reference resource such as IM-CSI-RS, CSI-RS, and/or CRS according to interference measurement type.

The use of $I_{CSI,0}$ or $I_{CSI,1}$ may be tied with the CSI reporting type whether it may be relevant from $C_{CSI,0}$ or $C_{CSI,1}$. If a CSI reporting may be related to $C_{CSI,0}$ then $I_{CSI,0}$ may be used for CSI calculation and $I_{CSI,1}$ may be used otherwise.

The use of $I_{CSI,0}$ or $I_{CSI,1}$ may be tied with the uplink subframe n in which a UE may want to or wish to report CSI. If a latest valid downlink subframe before n−4 belongs to reference resource $C_{CSI,0}$ then $I_{CSI,0}$ may be used and $I_{CSI,1}$ may be used otherwise.

If a UE may estimate multiple interference types, (e.g. intra-cell interference and inter-cell interference), from multiple reference resources, a UE behaviour for multi-type interference measurements may be at least one of following: 1) Type-1 interference belongs to one of the reference resources and Type-2 interference belongs to the rest of the reference resources; 2) Type-1 interference belongs to either $C_{CSI,0}$ or $C_{CSI,1}$ and Type-2 interference may have independent subframe set ($T_{CSI}$) which can be partially overlapped with $C_{CSI,0}$ or $C_{CSI,1}$ and the subframe set ($T_{CSI}$) can be configured by higher layers; 3) Type-2 interference belongs to either $C_{CSI,0}$ or $C_{CSI,1}$ and Type-1 interference may have independent subframe set ($T_{CSI}$) which may be partially overlapped with $C_{CSI,0}$ and/or $C_{CSI,1}$ and the subframe set ($T_{CSI}$) may be configured by higher layers; 4) New subframe subsets $T_{CSI,0}$ and $T_{CSI,1}$ may be defined for Type-1 and Type-2 interference estimation, where the subframe subsets may be defined within $C_{CSI,0}$ or $C_{CSI,1}$ and/or the subframe subsets may be defined independently for $C_{CSI,0}$ and $C_{CSI,1}$; and the like.

CSI Feedback Enhancement may also be provided and/or used. Since an eNB may not detect or see the interference a UE may experiencing in the downlink, a UE may suffer in downlink, and, as such, CSI feedback may be enhanced for support of interference minimization efforts at the eNB scheduler. For the distributed antenna based network deployment shown in the FIG. 16, a proper collaborating set selection at an eNB scheduler may reduce the interference.

A transmission point may transmit one CSI-RS or one set of CSI-RS. The Reference Signal Received Power (RSRP) may defined as follows: $RSRP_{i,CRS}^{(p)}$ TxPower(0): received CRS reference signal power of UE i of port p; TxPower (eNB)$RSRP_{i,CSI\text{-}RS}^{(p)}$ (j=0): received eNB' j=0, CSI-RS reference signal power of UE i of port p; $RSRP_{i,CSI\text{-}RS}^{(p)}$ (j>0)TxPower(0): received RRH j=1, . . . , M CSI-RS reference signal power of UE i of port p; and the like.

Embodiments contemplate signalling of deployment scenarios. For example, in an embodiment, the UE may be provided an indication of the deployment scenario by using and of several of the following solutions. The information or type of deployment scenario may be signaled to the UE via RRC signaling (such as RRCConnectionSetup or RCCConnectionReconfiguration messages). The information or type of deployment scenario may be signaled to the UE via MAC-CE signaling. A new bit field or one of the reserved bit fields of MAC-CE header may be used. The information or type of deployment scenario may be signaled to the UE via PHY signaling. A new bit field in the new extended PDCCH format can be used. 4. The information or type of deployment scenario may be broadcast on either PBCH or SIB. A new bit field in the P-BCH or SIB type k can be used for this purpose.

UE-centric TP selection may be provided and/or used. In an example, a UE may measure CSI-RS strength (e.g., RSRP of CSI-RS) of each TP within a measurement set, and may report an index of TPs if the CSI-RS strength of the TPs satisfies a threshold. For example, $[j, RSRP_{CSI-RS}^i]$=max $(RSRP_{CSI-RS}^i(\text{Macro}, j=0), RSRP_{CSI-RS}^i (\text{RRH}, j>0))$, if $RSRP_{CSI-RS}^i<\Delta$ then $j=0$ where $\Delta$ may be a threshold.

Embodiments contemplate Implicit Preferred TP reporting. For example, a UE may report CSI feedback for reporting set, and a PUCCH resource may be allocated for each TP in the reporting set. If 3 TPs may be configured in the reporting set, then 3 PUCCH resources may exist. A UE may report CSI for a TP within reporting through corresponding PUCCH resource when periodic reporting may be configured. The following UE behaviour may be defined for an eNB scheduler to determine preferred TPs from the UE. A UE may report CSI for all TPs in the reporting set, if the RSRP from the TPs satisfy a threshold in the corresponding PUCCH resources. The RSRP may be calculated for each TP in the reporting set. If a RSPS from a TP in the reporting set fails to satisfy a threshold, then a UE may transmit DTX in the corresponding PUCCH resource.

Embodiments contemplate Explicit Preferred TP reporting. A UE may report preferred TP in the measurement set to the eNB by using one or more of the following solutions. The information TP selection may be signalled to the eNB via RRC signalling (such as RRCConnectionSetupComplete or RRCConnectionReconfigurationComplete messages). The information or type of deployment scenario may be signalled to the eNB via MAC-CE signalling. A new bit field or one of the reserved bit fields of MAC-CE header may be used. The information or type of deployment scenario may be signalled to the eNB via PHY signalling. A new bit field in the new extended PUCCH format may be used.

Embodiments contemplate Adaptive PMI granularity feedback. To take the advantage of the presence of multiple Tx points with macro cell coverage and have efficient CQI feedback (among other reasons), different PMI and/or CQI feedback resolutions may be applied for different Tx points. For example, high PMI and/or CQI feedback resolution may be applied to a primary Tx point. The number of bits for PMI feedback of the primary Tx point may be more than typical 4 bits PMI (e.g. in Rel-8 to 10). Alternatively, lower PMI and/or CQI feedback resolution may be applied to a secondary Tx point. The number of bits for PMI feedback of the secondary Tx point may be fewer than typical 4 bits PMI (e.g. in Rel-8 to 10).

Embodiments contemplate RSRP Measurement reporting for each TP. In an embodiment, the UE may report a quantized RSRP for each TP. A separate report of RSRP may be sent to the eNB for the CRS and CSI-RS measurements. Another separate report may be sent for each antenna port that CSI-RS may be configured for.

Embodiments contemplate Frequency Selective RI reporting. For example, a UE may report RI per sub-band basis to provide finer resolution of RI feedback as compared with wideband RI feedback used in previous releases (Rel-8/9/10). Since the frequency selective RI reporting may work with frequency selective PMI reporting, the PUSCH reporting mode 3-2 supporting frequency selective PMI and CQI may be used for frequency selective RI reporting. The RI reporting granularity may be the same as PMI reporting granularity.

Embodiments contemplate one or more techniques to indicate presence of RI in PUCCH. For example, a UE may report one-bit report type indicator (RTI) in a least-frequently reported PUCCH feedback type to indicate whether the subsequent PUCCH reports contain rank indicator or not. Another (e.g., Tx 10) mode may be defined and extend the existing PUCCH mode 1-1 and 2-1 to support efficient RI reporting.

For example, a PUCCH 1-1—CSI Mode 1 ($W_1$ and $W_2$ reported in different subframes) may be used or provided. A Report 1 may include RI, sub-sampled $W_1$ (sub-sampling varies based on RI) and one-bit RTI (report type indicator), jointly encoded. A Report 2 may include RTI=1, wideband CQI and wideband $W_2$ (No $W_2$ sub-sampling); RTI=0, wideband CQI, sub-sampled wideband $W_2$ and RI (e.g. in this report, RI may be reported differentially to save signalling overhead. And then, the reported RI could be a delta RI); if $W_2$ codebook $C_2$ may be of size 1, wideband $W_2$ may not be signalled.

A PUCCH 1-1—CSI Mode 2 ($W_1$ and $W_2$ reported in same subframe) may also be provided and/or used. A Report 1 may include RI and one-bit RTI, jointly encoded. A Report 2 may include RTI=1, joint encoding of $W_1$ and $W_2$, and reported with WB CQI (e.g. sub-sampling may vary with pre-conditioned rank); RTI=0, joint encoding of $W_1$ and $W_2$, and reported with WB CQI plus (delta) RI (e.g. sub-sampling may vary with pre-conditioned rank); and the like.

PUCCH 2-1 may also be provided and/or used. A Report 1 may include RI, 1-bit precoder type indication (PTI) and 1-bit report type indicator (RTI). A Report 2 may include PTI=0 and RTI=1: $W_1$ that may be reported; PTI=0 and RTI=0: $W_1$ and RI that may be reported; PTI=1 and RTI=1: wideband CQI and wideband $W_2$ that may be reported; PTI=1 and RTI=0: wideband CQI, wideband $W_2$ and RI that may be reported; and the like. A Report 3 may include PTI=0: wideband CQI and wideband $W_2$ that may be reported; PTI=1: subband CQI, subband $W_2$; and the like. Report 1 may be reported every MRI*(J*K+1)*$N_c$ subframes. Report 2 may be reported every $N_c$*H subframes (e.g. H=M if PTI=O (M may be signalled by RRC) and/or H=(J*K+1) if PTI=1 (K may be signalled by RRC)). Report 3 may be reported every $N_c$ subframes.

In view of the aforementioned description and the FIGS. 1-24, one or more embodiments contemplate methods and devices configured to perform such methods, such as a wireless transmit/receive unit (WTRU) that may comprise a processor. In one or more embodiments, the processor may be configured, at least in part to identify one or more interference measurement resource elements that may be received from one or more transmission points. The processor may be further configured to perform interference measurement estimation based at least in part on energy associated with, and/or measured in, the identified one or more interference measurement resource elements. Also, the processor may be configured to generate channel state information (CSI) based at least in part on the one or more interference measurement estimation. In one or more embodiments, the processor may be configured to initiate a transmission of the CSI, and/or one or more CSI report to at least one of the one or more transmission points and/or one or more other nodes. In one or more embodiments, the one or more interference measurement resource elements may be received as part of a set of resource elements. Embodiments contemplate that the set of resource elements may further include empty resource elements (and/or resource elements that do not contain a physical downlink shared channel (PDSCH) symbol). In one or more embodiments, the processor may be further configured to perform rate-matching, perhaps for PDSCH decoding, based at least in part on the empty resource elements (and/or the resource elements that do not contain a PDSCH symbol).

In one or more embodiments, the one or more interference measurement resource elements may be received in one or more subframes designated for interference measurement. Embodiments contemplate that the one or more interference measurement resource elements may be received in one or more resource blocks designated for interference measurement. Further, the one or more interference measurement resource elements may have a respective position in the one or more interference measurement resource block.

In one or more embodiments, the set of resource elements may be defined as a subset of resource elements of a zero-power channel state indicator reference signal (CSI-RS). Also, in one or more embodiments, the set of zero-power CSI-RS may include at least four subsets of resource elements, where at least one of the at least four subsets of resource elements may be an interference measurement element subset and at least one of the four subsets of resource elements may be an empty resource element (and/or resource elements that do not contain a PDSCH symbol) subset. In one or more embodiments, the one or more interference measurement resource elements may be interference measurement channel state information reference signals (IM-CSI-RS) (or one or more interference measurement resources (IMR)).

In one or more embodiments, the one or more interference measurement resource elements may correspond to a respective type of interference. In some embodiments, the processor may be further configured to identify an estimation method type received from the one or more transmission points. Also, in some embodiments, the performance of the interference measurement estimation may be further based on the type of interference and the estimation method type.

In one or more embodiments, the respective positions of the one or more interference measurement resource elements in the one or more interference measurement resource blocks may be varied between different one or more interference measurement subframes. In addition, the variation may be based on at least one of a pseudo-random sequence or a modulo function. In some embodiments, the respective positions of the one or more interference measurement resource elements in the one or more interference measurement resource blocks may be varied between at least one of one or more different physical resource blocks (PRB) or one or more different virtual resource blocks (VRB). In one or more embodiments, the one or more interference measurement subframes may be separated in time, perhaps based at least in part on a pseudo-random sequence.

In one or more embodiments, each of the one or more interference measurement resource elements may respectively represent one or more interference measurement resource element instances. In some embodiments, the processor may be further configured to identify one or more non-interference measurement resource elements that may be received from the one or more transmission points at respective one or more non-interference measurement resource element instances. Also, in some embodiments, the processor may be configured to determine a coincidence condition between at least one of the one or more non-interference measurement resource element instances and at least one of the one or more interference measurement resource element instances. In one or more embodiments, the processor may be further configured to exclude from the performance of interference measurement estimation the at least one of the one or more interference measurement resource element instances upon the coincidence condition indicating at least one of the one or more interference measurement resource element instances coincided with the at least one of the one or more non-interference measurement resource element instances.

Embodiments contemplate methods and devices configured to perform such methods, such as a wireless transmit/receive unit (WTRU) that may comprise a processor. In one or more embodiments, the processor may be configured, at least in part to identify one or more interference measurement resource elements received from one or more transmission points. The processor may also be configured to identify one or more resource elements that may be assumed to contain or include a desired signal received from the one or more transmission points (or non-interference measurement resource elements received from the one or more transmission points). One or more embodiments contemplate that the processor may be configured to identify at least one type of channel state information (CSI). The processor may also be configured to perform interference measurement estimation based at least in part on energy associated with, and/or measured in, the one or more identified interference measurement resource elements; energy associated with, and/or measured in, the one or more resource elements that may be assumed to contain or include a desired signal (or the one or more non-interference measurement resource elements); and/or the type of CSI.

In one or more embodiments, the processor may also be configured to generate channel state information (CSI), perhaps in the form of one or more reports, for the identified type of CSI, based at least in part on the interference measurement estimation. Also, the processor may be configured to initiate a transmission of the CSI report to at least one of the one or more transmission points and/or one or more other nodes. In one or more embodiments, at least one of the one or more resource elements assumed to contain a desired signal (or at least one of the one or more non-interference measurement resource elements) may be a non-zero-power channel state indicator reference signal (CSI-RS). And in one or more embodiments, the processor may be further configured to apply at least one of a linear or logarithmic value to the interference measurement estimation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system described above are possible without departing from the scope of the invention. In view of the wide variety of embodiments that can be applied, it should be understood that the illustrated embodiments are exemplary, and should not be taken as limiting the scope of the following claims.

What is claimed is:

1. A wireless transmit/receive unit (WTRU) comprising:
a processor configured to:
    determine a first configuration of interference measurement (IM) resources, the first configuration of IM resources comprising at least one of a first configuration of non-zero-power (NZP) channel state information (CSI) reference signal (CSI-RS) resources and a first configuration of CSI-IM resources, the first configuration of NZP CSI-RS resources corresponding to a first set of resource elements (REs), and the first configuration of CSI-IM resources corresponding to a second set of REs; and
    determine a second configuration of IM resources, the second configuration of IM resources comprising at least one of a second configuration of NZP CSI-RS resources and a second configuration of CSI-IM resources, the second configuration of NZP CSI-RS resources corresponding to a third set of REs, and the second configuration of CSI-IM resources corresponding to a fourth set of REs; and
a transmitter configured to:
    in response to a determination that a first aperiodic CSI report associated with the first configuration of IM resources has been triggered, send the first CSI report using a first aperiodic CSI report configuration; and
    in response to a determination that a second aperiodic CSI report associated with the second configuration of IM resources has been triggered, send the second aperiodic CSI report using a second CSI report configuration, wherein the second CSI report configuration is different from the first CSI report configuration.

2. The WTRU of claim 1, wherein the first configuration of IM resources corresponds to the first CSI report configuration, and the second configuration of IM resources corresponds to the second CSI report configuration.

3. The WTRU of claim 1, wherein the processor is further configured to measure a first energy in at least one of: the first set of REs, or the second set of REs, and wherein the first aperiodic CSI report is based at least on the measured first energy.

4. The WTRU of claim 3, wherein the processor is further configured to determine that the measured first energy is a first interference energy.

5. The WTRU of claim 1, wherein the processor is further configured to measure a second energy in at least one of: the third set of REs, or the fourth set of REs, and wherein the second aperiodic CSI report is based at least on the measured second energy.

6. The WTRU of claim 5, wherein the processor is further configured to determine that the measured second energy is a second interference energy.

7. The WTRU of claim 1, wherein the first configuration of CSI-IM resources includes at least one of: a first resourceConfig, or a first subframeConfig.

8. The WTRU of claim 1, wherein the second configuration of CSI-IM resources includes at least one of: a second resourceConfig, or a second subframeConfig.

9. The WTRU of claim 1, wherein the first configuration of IM resources further comprises a first configuration of zero-power (ZP) CSI-RS resources, the first configuration of ZP CSI-RS resources corresponding to a fifth set of REs.

10. The WTRU of claim 1, wherein the second configuration of IM resources further comprises a second configuration of ZP CSI-RS resources, the second configuration of ZP CSI-RS resources corresponding to a sixth set of REs.

11. A method performed by a wireless transmit/receive unit (WTRU), the method comprising:
    determining a first configuration of interference measurement (IM) resources, the first configuration of IM resources comprising at least one of a first configuration of non-zero-power (NZP) channel state information (CSI) reference signal (CSI-RS) resources and a first configuration of CSI-IM resources, the first configuration of NZP CSI-RS resources corresponding to a first set of resource elements (REs), and the first configuration of CSI-IM resources corresponding to a second set of REs;
    determining a second configuration of IM resources, the second configuration of IM resources comprising at least one of a second configuration of NZP CSI-RS resources and a second configuration of CSI-IM resources, the second configuration of NZP CSI-RS resources corresponding to a third set of REs, and the second configuration of CSI-IM resources corresponding to a fourth set of REs;
    in response to a determination that a first aperiodic CSI report associated with the first configuration of IM resources has been triggered, sending the first aperiodic CSI report using a first CSI report configuration; and
    in response to a determination that a second aperiodic CSI report associated with the second configuration of IM resources has been triggered, sending the second aperiodic CSI report using a second CSI report configuration, wherein the second CSI report configuration is different from the first CSI report configuration.

12. The method of claim 11, wherein the first configuration of IM resources corresponds to the first CSI report configuration, and the second configuration of IM resources corresponds to the second CSI report configuration.

13. The method of claim 11, further comprising:
    measuring a first energy in at least one of: the first set of REs, or the second set of REs,
    wherein the first aperiodic CSI report is based at least on the measured first energy.

14. The method of claim 13, further comprising determining that the measured first energy is a first interference energy.

15. The method of claim 11, further comprising:
    measuring a second energy in at least one of: the third set of REs, or the fourth set of REs,
    wherein the second aperiodic CSI report is based at least on the measured second energy.

16. The method of claim 15, further comprising determining that the measured second energy is a second interference energy.

17. The method of claim 11, wherein the first configuration of CSI-IM resources includes at least one of: a first resourceConfig, or a first subframeConfig.

18. The method of claim 11, wherein the second configuration of CSI-IM resources includes at least one of: a second resourceConfig, or a second subframeConfig.

19. The method of claim 11, wherein the first configuration of IM resources further comprises a first configuration of zero-power (ZP) CSI-RS resources, the first configuration of ZP CSI-RS resources corresponding to a fifth set of REs.

20. The method of claim 11, wherein the second configuration of IM resources further comprises a second configuration of ZP CSI-RS resources, the second configuration of ZP CSI-RS resources corresponding to a sixth set of REs.

\* \* \* \* \*